(12) United States Patent
Shi et al.

(10) Patent No.: US 12,335,794 B2
(45) Date of Patent: Jun. 17, 2025

(54) QoS UPDATE HANDLING ALTERNATIVES DURING Xn HO

(71) Applicant: Telefonaktiebolaget LM Ericsson (publ), Stockholm (SE)

(72) Inventors: Nianshan Shi, Järfälla (SE); Paul Schliwa-Bertling, Ljungsbro (SE); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 18/027,140

(22) PCT Filed: Sep. 21, 2021

(86) PCT No.: PCT/IB2021/058611
§ 371 (c)(1),
(2) Date: Mar. 20, 2023

(87) PCT Pub. No.: WO2022/058994
PCT Pub. Date: Mar. 24, 2022

(65) Prior Publication Data
US 2023/0337069 A1   Oct. 19, 2023

Related U.S. Application Data

(60) Provisional application No. 63/081,084, filed on Sep. 21, 2020.

(51) Int. Cl.
*H04W 36/00* (2009.01)
(52) U.S. Cl.
CPC .... *H04W 36/0044* (2013.01); *H04W 36/0011* (2013.01); *H04W 36/0072* (2013.01)

(58) Field of Classification Search
CPC ............. H04L 47/24; H04W 36/0044; H04W 36/0011; H04W 36/0072; H04W 8/04; H04W 28/0226; H04W 28/0268
See application file for complete search history.

(56) References Cited

U.S. PATENT DOCUMENTS

| 2020/0112907 A1* | 4/2020 | Dao ................. H04M 15/8016 |
| 2021/0307100 A1* | 9/2021 | Talebi Fard ......... H04W 76/18 |
| 2023/0199568 A1* | 6/2023 | Vesely ................. H04W 28/24 |
| | | 455/422.1 |

OTHER PUBLICATIONS

Author Unknown, "Technical Specification Group Services and System Aspects; Single Radio Voice Call Continuity (SRVCC); Stage 2 (Release 16)," Technical Specification 23.216, Version 16.4.0, Mar. 2020, 3GPP Organizational Partners, 77 pages.

(Continued)

*Primary Examiner* — Khoa Huynh
(74) *Attorney, Agent, or Firm* — Withrow & Terranova, PLLC

(57) ABSTRACT

Methods supporting a Quality of Service (QoS) update during a Handover (HO) procedure are disclosed herein. More specifically, methods performed by a Radio Access Network (RAN) node and a Core Network (CN) node for supporting a QoS update during an HO are provided. The methods disclosed herein can facilitate flexible New Generation (NG)-RAN (NG-RAN) deployment with a mixture of NG-RAN nodes capable or incapable of supporting additional parameters in an HO procedure. The methods also make it possible to provide smooth NG-RAN software updates between different software releases.

9 Claims, 18 Drawing Sheets

(56) References Cited

OTHER PUBLICATIONS

Author Unknown, "Technical Specification Group Services and System Aspects; Architecture enhancements for 5G System (5GS) to support Vehicle-to-Everything (V2X) services (Release 16)," Technical Specification 23.287, Version 16.3.0, Jul. 2020, 3GPP Organizational Partners, 57 pages.

Author Unknown, "Technical Specification Group Services and System Aspects; System architecture for the 5G System (5GS); Stage 2 (Release 16)," Technical Specification 23.501, Version 16.5.1, Aug. 2020, 3GPP Organizational Partners, 440 pages.

Author Unknown, "Technical Specification Group Services and System Aspects; Procedures for the 5G System (5GS); Stage 2 (Release 16)," Technical Specification 23.502, Version 16.5.1, Aug. 2020, 3GPP Organizational Partners, 594 pages.

Author Unknown, "Technical Specification Group Services and System Aspects; Security architecture and procedures for 5G system (Release 16)," Technical Specification 33.501, Version 16.3.0, Jul. 2020, 3GPP Organizational Partners, 248 pages.

Author Unknown, "Technical Specification Group Radio Access Network; NG-RAN; NG Application Protocol (NGAP) (Release 16)" Technical Specification 38.413, Version 16.2.0, Jul. 2020, 3GPP Organizational Partners, 462 pages.

Ericsson, "R3-20xxxx: Handing CN PDB in Handover," 3GPP TSG-RAN WG3 Meeting #110-e, Nov. 2-12, 2020, Electronic Meeting, 14 pages.

Ericsson, "S2-20xxxx: QoS parameter update at Xn HO," 3GPP TSG-SA WG2 Meeting #140e, Oct. 12-23, 2020, Electronic Meeting, 9 pages.

Ericsson, et al., "S2-1912450: Management of GBR QoS Flows at handover," 3GPP SA WG2 Meeting #S2-136, Nov. 18-22, 2019, Reno, Nevada, 3 pages.

International Search Report and Written Opinion for International Patent Application No. PCT/IB2021/058611, mailed Dec. 14, 2021, 19 pages.

Written Opinion for International Patent Application No. PCT/IB2021/058611, mailed Sep. 16, 2022, 7 pages.

International Preliminary Report on Patentability for International Patent Application No. PCT/IB2021/058611, mailed Dec. 21, 2022, 63 pages.

* cited by examiner

| IE/Group Name | Presence | Range | IE type and reference | Semantics description | Criticality | Assigned Criticality |
|---|---|---|---|---|---|---|
| DL NG-U UP TNL Information | M | | UP Transport Layer Information 9.3.2.2 | NG-RAN node endpoint of the NG-U transport bearer, for delivery of DL PDUs. | - | |
| DL NG-U TNL Information Reused | O | | ENUMERATED (true, ...) | Indicates that DL NG-U TNL Information has been reused. | - | |
| User Plane Security Information | O | | 9.3.1.60 | | - | |
| QoS Flow Accepted List | | 1 | | QoS flows associated with the *DL NG-U UP TNL Information* IE. | - | |
| >QoS Flow Accepted Item | | 1..<maxnoofQoSFlows> | | | - | |
| >>QoS Flow Identifier | M | | 9.3.1.51 | | - | |
| >>Current QoS Parameters Set Index | O | | Alternative QoS Parameters Set Index 9.3.1.152 | Index to the currently fulfilled alternative QoS parameters set. | YES | ignore |
| Additional DL QoS Flow per TNL Information | O | | QoS Flow per TNL Information List 9.3.2.1 | NG-RAN node endpoint of the additional NG-U transport bearer(s) for delivery of DL PDUs for split PDU session, together with associated QoS flows. | YES | ignore |
| Redundant DL NG-U UP TNL Information | O | | UP Transport Layer Information 9.3.2.2 | NG-RAN node endpoint of the NG-U transport bearer, for delivery of redundant DL PDUs. | YES | ignore |
| Redundant DL NG-U TNL Information Reused | O | | ENUMERATED (true, ...) | Indicates that Redundant DL NG-U TNL Information has been reused. | YES | ignore |
| Additional Redundant DL QoS Flow per TNL Information | O | | QoS Flow per TNL Information List 9.3.2.1 | NG-RAN node endpoint of the additional NG-U transport bearer(s) for delivery of Redundant DL PDUs for split PDU session, together with associated QoS flows. | YES | ignore |
| Used RSN Information | O | | Redundant PDU Session Information 9.3.1.136 | | YES | ignore |
| Global RAN Node ID of Secondary NG-RAN Node | O | | 9.3.1.5 | | YES | ignore |
| support for reception of additional QoS parameters | O | | ENUMERATED (true, false) | | YES | ignore |

*FIG. 8*

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN UE NGAP ID | M | | 9.3.3.2 | | YES | reject |
| Source AMF UE NGAP ID | M | | AMF UE NGAP ID 9.3.3.1 | | YES | reject |
| User Location Information | M | | 9.3.1.16 | | YES | ignore |
| UE Security Capabilities | M | | 9.3.1.86 | | YES | ignore |
| PDU Session Resource to be Switched in Downlink List | | 1 | | | YES | reject |
| >PDU Session Resource to be Switched in Downlink Item | | 1..<maxnoofPDUSessions> | | | - | |
| >>PDU Session ID | M | | 9.3.1.50 | | - | |
| >>Path Switch Request Transfer | M | | OCTET STRING | Containing the Path Switch Request Transfer IE specified in subclause 9.3.4.8. | - | |
| PDU Session Resource Failed to Setup List | | 0..1 | | | YES | ignore |
| >PDU Session Resource Failed to Setup Item | | 1..<maxnoofPDUSessions> | | | - | |
| >>PDU Session ID | M | | 9.3.1.50 | | - | |
| >>Path Switch Request Setup Failed Transfer | M | | OCTET STRING | Containing the Path Switch Request Setup Failed Transfer IE specified in subclause 9.3.4.15. | - | |
| RRC Resume Cause | O | | RRC Establishment Cause 9.3.1.111 | | YES | ignore |

| Range bound | Explanation |
|---|---|
| maxnoofPDUSessions | Maximum no. of PDU sessions allowed towards one UE. Value is 256. |

*FIG. 16*

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| UE Security Capabilities | O | | 9.3.1.86 | | YES | reject |
| Security Context | M | | 9.3.1.88 | | YES | reject |
| New Security Context Indicator | O | | 9.3.1.55 | | YES | reject |
| PDU Session Resource Switched List | | 1 | | | YES | ignore |
| >PDU Session Resource Switched Item | | 1..<maxnoofPDUSessions> | | | - | |
| >>PDU Session ID | M | | 9.3.1.50 | | - | |
| >>Path Switch Request Acknowledge Transfer | M | | OCTET STRING | Containing the Path Switch Request Acknowledge Transfer IE specified in subclause 9.3.4.9. | - | |
| PDU Session Resource Released List | | 0..1 | | | YES | ignore |
| >PDU Session Resource Released Item | | 1..<maxnoofPDUSessions> | | | - | |
| >>PDU Session ID | M | | 9.3.1.50 | | - | |
| >>Path Switch Request Unsuccessful Transfer | M | | OCTET STRING | Containing the Path Switch Request Unsuccessful Transfer IE specified in subclause 9.3.4.20. | - | |
| Allowed NSSAI | M | | 9.3.1.31 | Indicates the S-NSSAIs permitted by the network. | YES | reject |
| Core Network Assistance Information for RRC INACTIVE | O | | 9.3.1.15 | | YES | ignore |
| RRC Inactive Transition Report Request | O | | 9.3.1.91 | | YES | ignore |
| Criticality Diagnostics | O | | 9.3.1.3 | | YES | ignore |
| Redirection for Voice EPS Fallback | O | | 9.3.1.116 | | YES | ignore |

| Range bound | Explanation |
|---|---|
| maxnoofPDUSessions | Maximum no. of PDU sessions allowed towards one UE. Value is 256. |

*FIG. 17*

QoS UPDATE HANDLING ALTERNATIVES DURING Xn HO

RELATED APPLICATIONS

This application is a 35 U.S.C. § 371 national phase filing of International Application No. PCT/IB2021/058611, filed Sep. 21, 2021, which claims the benefit of provisional patent application Ser. No. 63/081,084, filed Sep. 21, 2020, the disclosures of which are hereby incorporated herein by reference in their entireties.

TECHNICAL FIELD

The technology of the disclosure relates generally to enabling handling of Quality-of-Service (QoS) during a Handover (HO) procedure.

BACKGROUND

3GPP (Third Generation Partnership Project) has specified handling of Quality-of-Service (QoS) during Xn Handover (HO) in New Radio (NR) (a.k.a. NG) (a.k.a. 5G HO) (or X2 HO in EPS). The logic is that during Xn HO, the QoS parameters remain unchanged. The change that can happen is the user plane tunnel information at the Radio Access Network (RAN) side and also possibly the user plane tunnel information at the Core Network (CN) side.

If any QoS parameter updates are needed, the CN can trigger a separate Protocol Data Unit (PDU) session modification procedure to enforce the needed update after the handover.

The current NG Application Protocol (NGAP) messages handling Xn HO (i.e., Path Switch Request/Path Switch Request Ack) are so defined, for example, not to include QoS parameters in these messages).

SUMMARY

Embodiments disclosed herein include supporting a Quality of Service (QoS) update during a Handover (HO) procedure. More specifically, methods performed by a Radio Access Network (RAN) node and a Core Network (CN) node for supporting a QoS update during an HO are provided. The methods disclosed herein can facilitate flexible New Generation (NG)-RAN (NG-RAN) deployment with a mixture of NG-RAN nodes capable or incapable of supporting additional parameters in an HO procedure. The methods also make it possible to provide smooth NG-RAN software updates between different software releases.

In one aspect, a method performed by a RAN node for supporting a QoS update during an HO procedure is provided. The method includes providing an indication to a CN node to indicate whether the RAN node can support the QoS update during the HO procedure. The method also includes performing one or more actions related to the HO procedure in accordance with the indication provided to the CN node.

In another aspect, providing the indication comprises providing the indication in a Path Switch Request message.

In another aspect, the Path Switch Request message comprises a 'support for reception of additional QoS parameters' field configured to indicate whether the RAN node can support the QoS update during the HO procedure.

In another aspect, the Path Switch Request message comprises one or more of a 'best QoS available' and a 'best RAN Packet Delay Budget, PDB' field configured to indicate one or more best-possible QoS parameters the RAN node can support.

In another aspect, providing the indication comprises providing the indication during a New Generation Application Protocol (NGAP) procedure.

In another aspect, providing the indication comprises providing the indication to indicate one or more QoS parameters that can be updated during the HO procedure.

In another aspect, the one or more QoS parameters comprise one or more of a CN Packet Delay Budget (PDB) and Traffic Characteristics (TCS).

In another aspect, providing the indication comprises providing the indication in a New Generation (NG) Setup Request message.

In another aspect, performing one or more actions related to the HO procedure comprises one of: receiving the QoS update during the HO procedure in response to the indication indicating that the RAN node can support the QoS update during the HO procedure, not receiving the QoS update during the HO procedure in response to the indication indicating that the RAN node cannot support the QoS update during the HO procedure, and receiving the QoS update during a Protocol Data Unit (PDU) session in response to the indication indicating that the RAN node cannot support the QoS update during the HO procedure.

In one aspect, a RAN node is provided. The RAN node includes processing circuitry configured to cause the RAN node to provide an indication to a CN node to indicate whether the RAN node can support the QoS update during the HO procedure. The processing circuitry is also configured to cause the RAN node to perform one or more actions related to the HO procedure in accordance with the indication provided to the CN node.

In another aspect, the processing circuitry is further configured to cause the RAN node to perform any of the steps in the method performed by the RAN node.

In one aspect, a method performed by a CN node for supporting a QoS update during an HO procedure is provided. The method includes receiving an indication from a RAN node that indicates whether the RAN node can support the QoS update during the HO procedure. The method also includes performing one or more actions related to the HO procedure in accordance with the indication received from the RAN node.

In another aspect, receiving the indication comprises receiving the indication in a Path Switch Request message.

In another aspect, the Path Switch Request message comprises a 'support for reception of additional QoS parameters' field configured to indicate whether the RAN node can support the QoS update during the HO procedure.

In another aspect, the Path Switch Request message comprises one or more of a 'best QoS available' and a 'best RAN Packet Delay Budget, PDB' field configured to indicate one or more best-possible QoS parameters the RAN node can support.

In another aspect, receiving the indication comprises receiving the indication during an NGAP procedure.

In another aspect, receiving the indication comprises receiving the indication to indicate one or more QoS parameters that can be updated during the HO procedure.

In another aspect, the one or more QoS parameters comprise one or more of a CN PDB and TCS.

In another aspect, receiving the indication comprises receiving the indication in a NG Setup Request message.

In another aspect, performing one or more actions related to the HO procedure comprises one of: a QoS update during the HO procedure in response to the indication indicating that the RAN node can support the QoS update during the HO procedure, not providing the QoS update during the HO procedure in response to the indication indicating that the RAN node cannot support the QoS update during the HO procedure, and providing the QoS update during a PDU session in response to the indication indicating that the RAN node cannot support the QoS update during the HO procedure.

In another aspect, performing one or more actions related to the HO procedure further comprises one or more of: forwarding the indication from an Intermediate Session Management Function (I-SMF) associated with the CN node to a Session Management Function (SMF) associated with the CN node and forwarding the indication from a Visited SMF (V-SMF) associated with the CN node to a Home SMF (H-SMF) associated with the CN node.

In one aspect, a CN is provided. The CN node includes processing circuitry configured to cause the CN node to receive an indication from a RAN node that indicates whether the RAN node can support the QoS update during the HO procedure. The processing circuitry is also configured to cause the CN node to perform one or more actions related to the HO procedure in accordance with the indication received from the RAN node.

In another aspect, the processing circuitry is further configured to cause the CN node to perform any of the steps in the method performed by the CN node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates an exemplary message transmitted from the RAN node in FIGS. 4 and 6 to the CN node in FIGS. 5 and 7;

FIG. 16 illustrates a message sent by a Next Generation (NG) RAN to an Access and Mobility Management Function (AMF);

FIG. 17 illustrates a message sent from an AMF to an NG-RAN;

DETAILED DESCRIPTION

Figure 1:
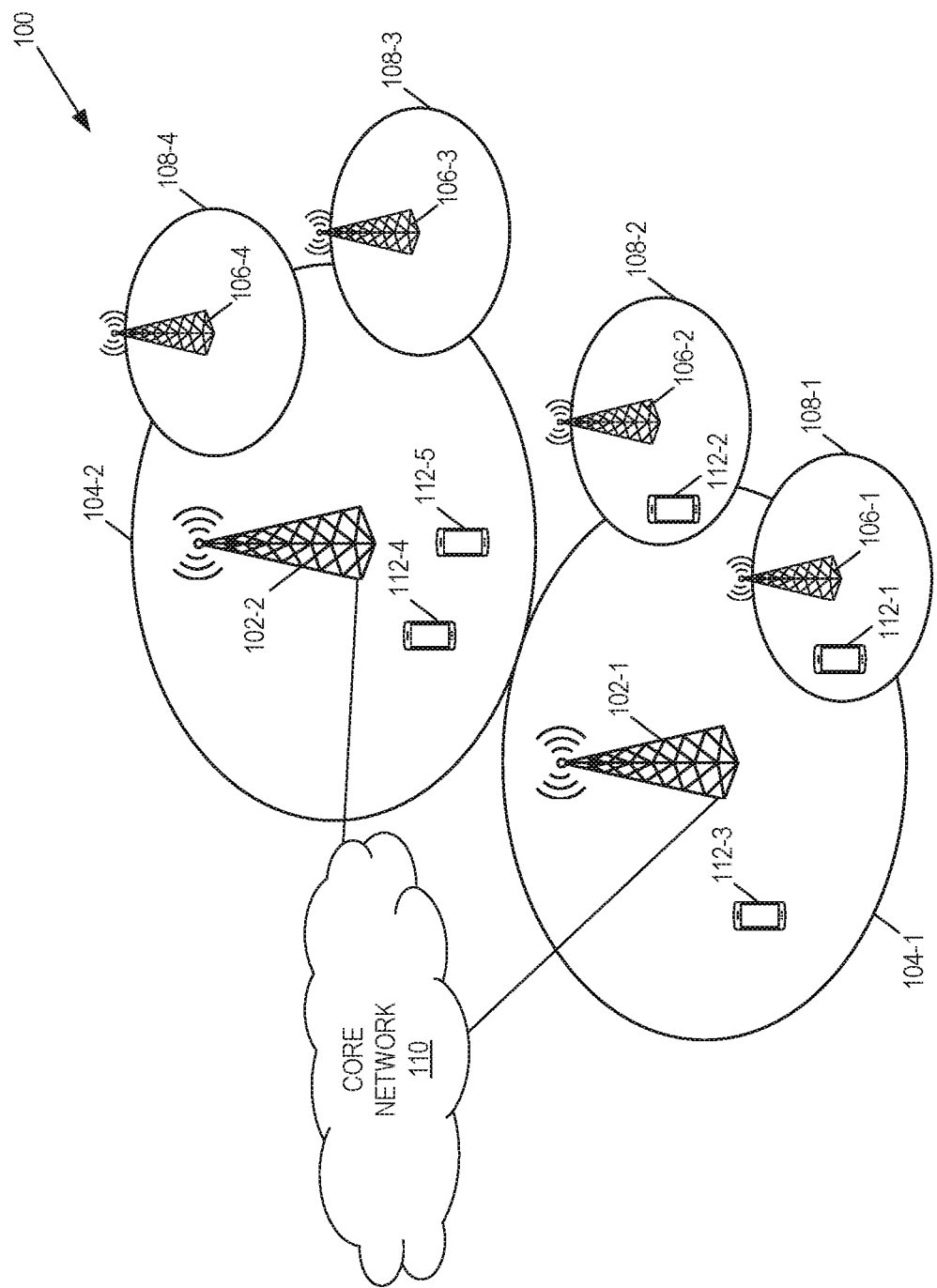
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Ultra Reliable and Low Latency Communication (URLLC) is supported in 3GPP Stage 2 specifications (e.g., 23.501 and 23.502). The 3GPP Stage 2 specifications indicate that during a Xn HO procedure, the QoS parameter (i.e., CN Packet Delay Budget (PDB)) can be updated as part of the Xn HO procedure (i.e., in the Path Switch Request Ack message).

This may have a fundamental impact on Xn HO related NGAP messages, such as Path Switch procedure. It introduces more complicated handling in RAN. Considering that CN PDB change during Xn HO is a debatable issue, QoS parameters updated in an Xn HO NGAP message should be considered as one alternative, but not the only alternative.

In a radio network deployed with mixed RAN nodes that may or may not be capable to support QoS parameters in Xn HO NGAP messages, it may create inconsistency issues between a CN node and an NG Radio Access Network (NG-RAN) node if the NG-RAN node does not support QoS parameters in the Xn HO NGAP message.

Certain aspects of the present disclosure and their embodiments may provide solutions to the aforementioned or other challenges. Embodiments disclosed herein are directed to solving the inconsistency issues between the CN node and the NG-RAN node when QoS related parameters (e.g., CN PDB) are updated during Xn Handover.

The essence of the solution is to provide means for avoiding Paging collision when a UE with more than one SIM-card is registered to more than one network at the same time.

There are, proposed herein, various embodiments which address one or more of the issues disclosed herein. In one aspect, a method performed by a RAN node for supporting a QoS update during a HO (e.g., Xn HO in 5G or X2 HO in EPS) procedure is provided. The method includes providing an indication to a CN node to indicate whether the RAN node can support the QoS update during the HO procedure. The method also includes receiving the QoS update during the HO procedure in response to providing the indication that indicates the RAN node can support the QoS update during the HO procedure.

In another aspect, a method performed by a CN node for supporting QoS update during a HO (e.g., Xn HO in 5G or X2 HO in EPS) procedure is provided. The method includes receiving an indication from a RAN node that indicates whether the RAN node can support the QoS update during the HO procedure. The method also includes providing the QoS update based on the indication received from the RAN node.

Certain embodiments may provide one or more of the following technical advantage(s). The proposed solution solves the CN and NG-RAN node inconsistency and provides possibility for the RAN to impact the way of additional parameters delivery.

Embodiments disclosed herein can facilitate flexible NG-RAN deployment with a mixture of NG-RAN nodes capable or incapable of supporting additional parameters in a Xn HO procedure. The embodiments also make it possible to provide smooth NG-RAN software updates from one 3GPP release to another release.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC). In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
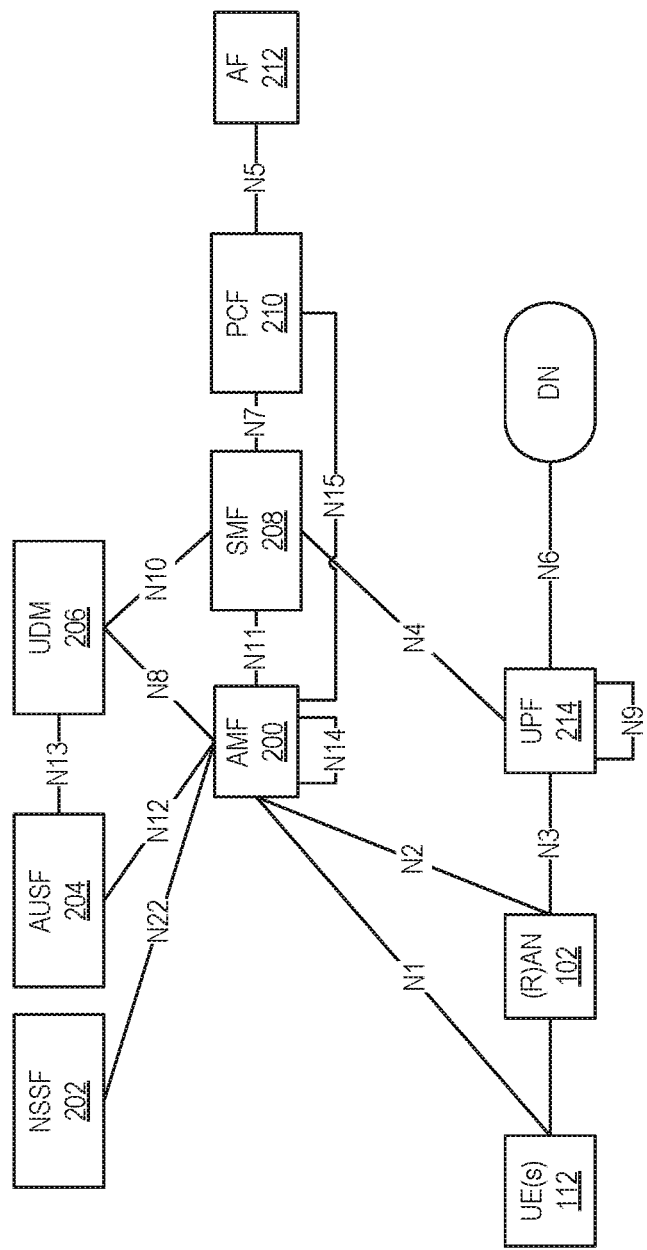
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g., such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
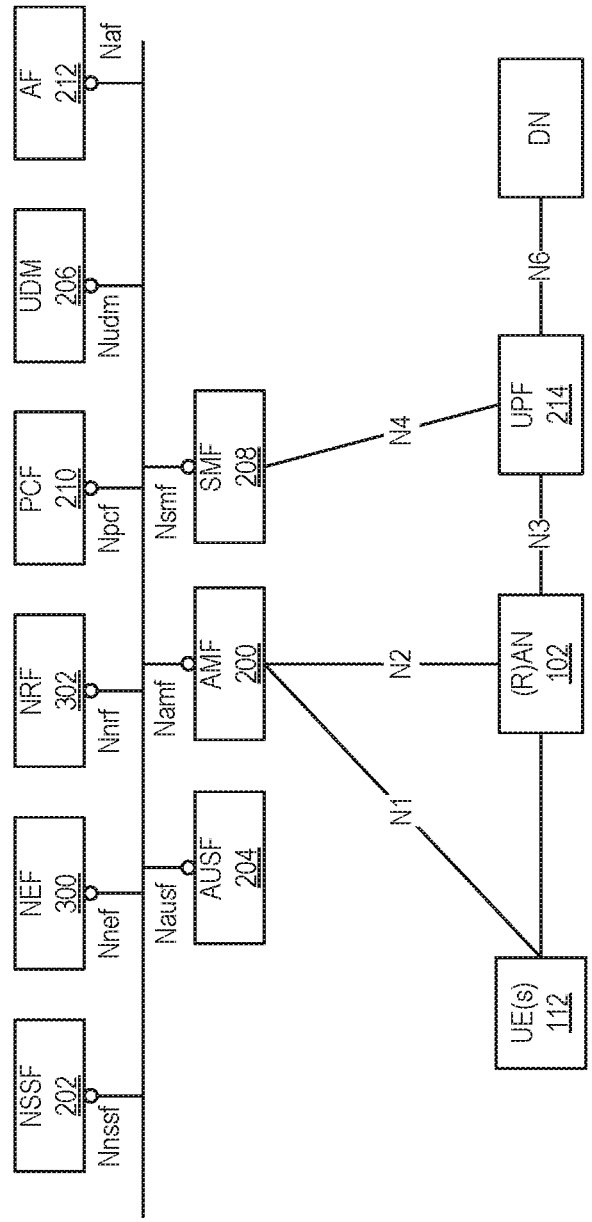
FIG. 3 illustrates a 5G network architecture using service-based interfaces between the NFs in a Control Plane (CP), instead of the point-to-point reference points/interfaces used in the 5G network architecture of FIG. 2.

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

Figure 4:
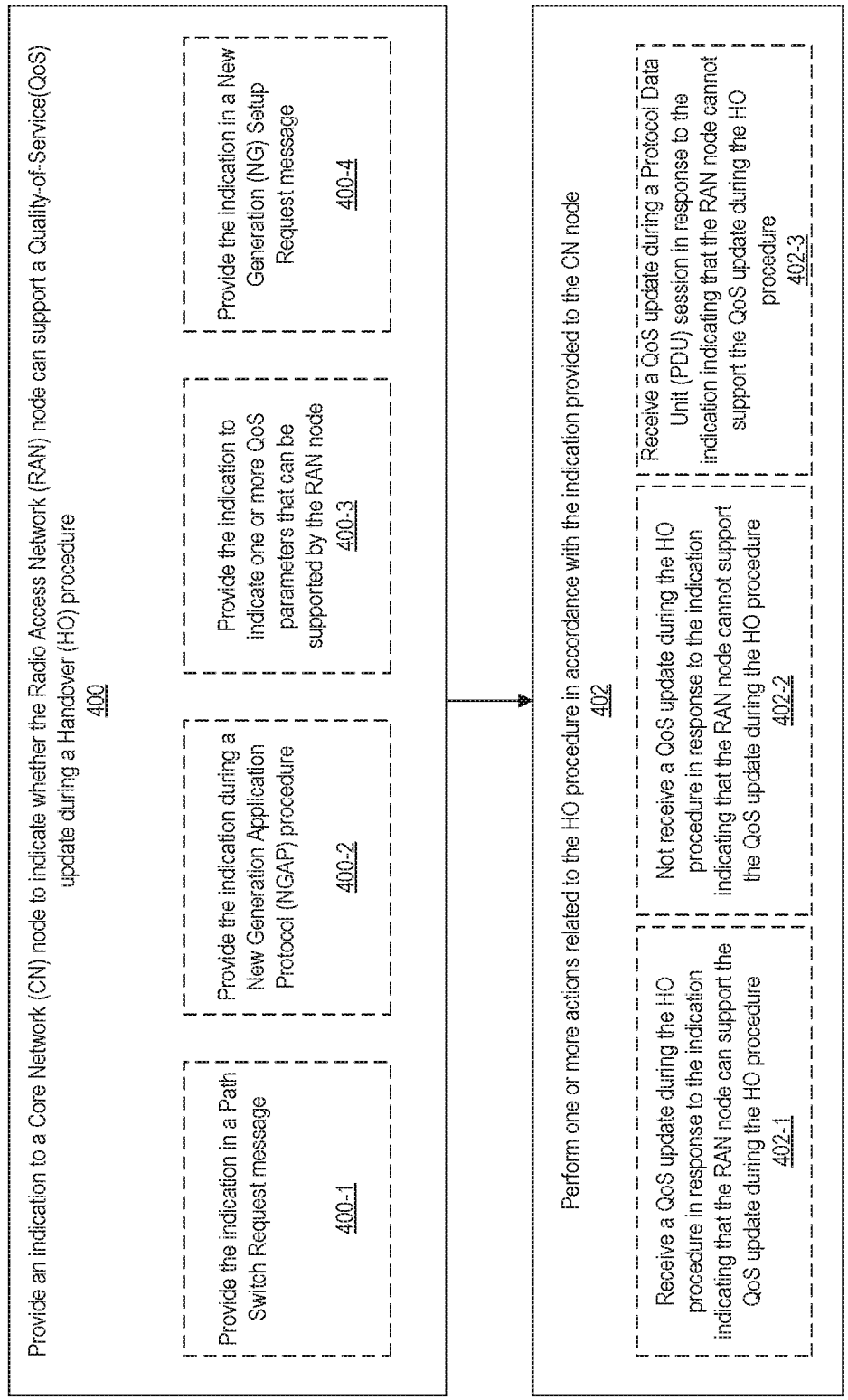
FIG. 4 is a flowchart of an exemplary method performed by a Radio Access Network (RAN) node for supporting a Quality-of-Service (QoS) update during a Handover (HO) procedure according to embodiments of the present disclosure.
Figure 5:
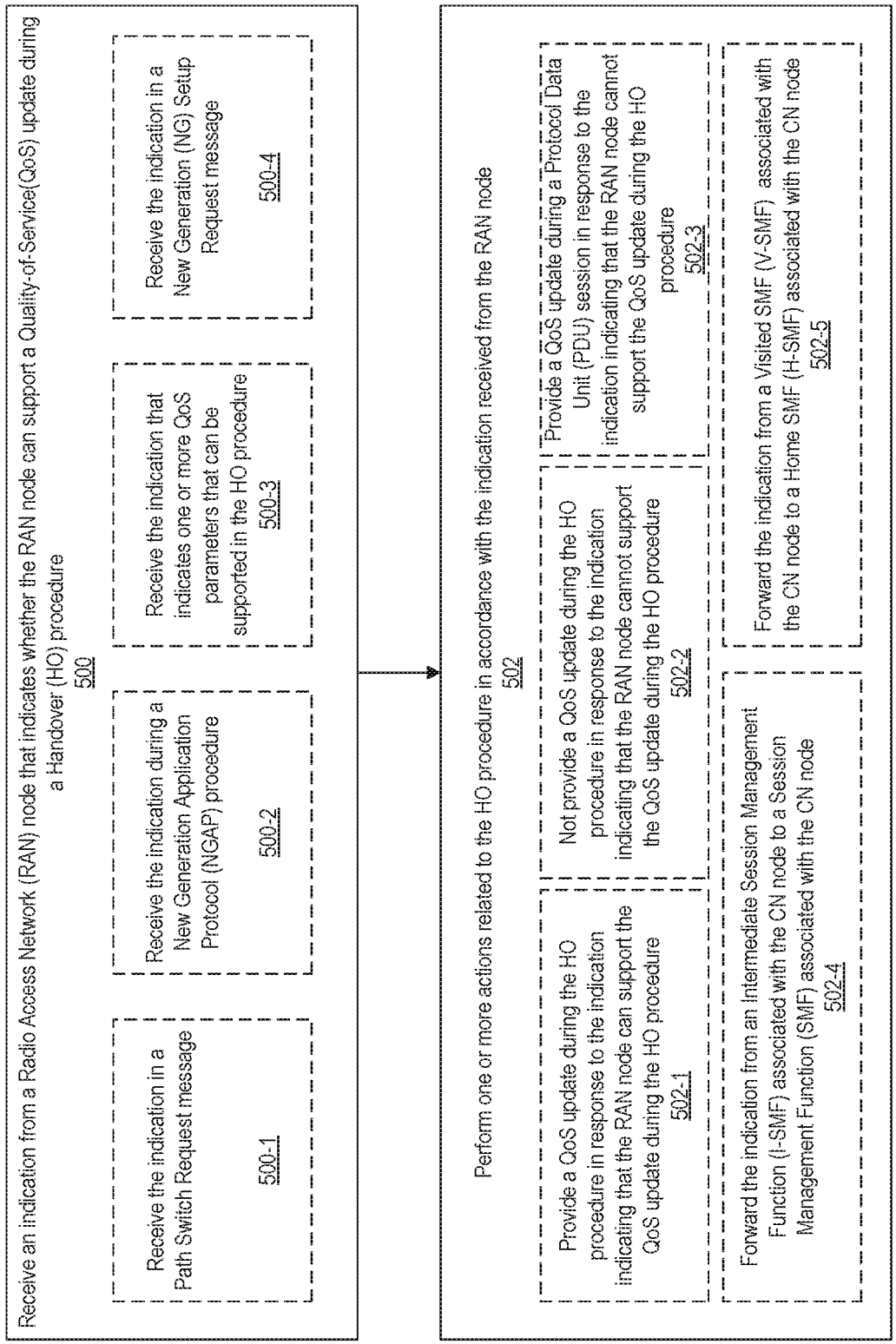
FIG. 5 is a flowchart of an exemplary method performed by a Core Network (CN) node for supporting a QoS update during a HO procedure according to embodiments of the present disclosure.

An NF may be implemented either as a network element on a dedicated hardware, as a software instance running on a dedicated hardware, or as a virtualized function instantiated on an appropriate platform, e.g., a cloud infrastructure Before discussing specific embodiments of the present disclosure, a pair of high-level processes that may be employed by an NG-RAN node (e.g., the base stations 102 in FIG. 1) and a CN node (e.g., the core network 110 in FIG. 1) for supporting QoS update during Xn HO are first provided with reference to FIGS. 4 and 5.

FIG. 4 is a flowchart of an exemplary method performed by a RAN node for supporting a QoS update during an HO procedure according to embodiments of the present disclosure. The RAN node is configured to provide an indication to a CN node to indicate whether the RAN node can support a QoS update during an HO procedure (step 400). In one embodiment, the RAN node can provide the indication in a Path Switch Request message (step 400-1). In another embodiment, the RAN node can provide the indication during an NG Application Protocol (NGAP) procedure (step 400-2). In another embodiment, the RAN node can provide the indication to indicate one or more QoS parameters that can be supported by the RAN node (step 400-3). In another embodiment, the RAN node can provide the indication in an NG Setup Request message (step 400-4).

The RAN node can then perform one or more actions related to the HO procedure in accordance with the indication provided to the CN node (step 402). In one embodiment, the RAN node can receive a QoS update during the HO procedure in response to the indication indicating that the RAN node can support the QoS update during the HO procedure (step 402-1). In another embodiment, the RAN node does not receive a QoS update during the HO procedure in response to the indication indicating that the RAN node cannot support the QoS update during the HO procedure (step 402-2). In another embodiment, the RAN node can receive a QoS update during a Protocol Data Unit (PDU) session in response to the indication indicating that the RAN node cannot support the QoS update during the HO procedure (step 402-3).

FIG. 5 is a flowchart of an exemplary method performed by a CN node for supporting a QoS update during a HO procedure according to embodiments of the present disclosure. The CN node can receive an indication from a RAN node that indicates whether the RAN node can support a QoS update during an HO procedure (step 500). In one embodiment, the CN node can receive the indication in a Path Switch Request message (step 500-1). In another embodiment, the CN node can receive the indication during an NGAP procedure (step 500-2). In another embodiment, the CN node can receive the indication that indicates one or more QoS parameters that can be supported in the HO procedure (step 500-3). In another embodiment, the CN node can receive the indication in an NG Setup Request message (step 500-4).

Accordingly, the CN node can perform one or more actions related to the HO procedure in accordance with the indication received from the RAN node (step 502). In one embodiment, the CN node can provide a QoS update during the HO procedure in response to the indication indicating that the RAN node can support the QoS update during the HO procedure (step 502-1). In another embodiment, the CN node does not provide a QoS update during the HO procedure in response to the indication indicating that the RAN node cannot support the QoS update during the HO procedure (step 502-2). In another embodiment, the CN node can provide a QoS update during a PDU session in response to the indication indicating that the RAN node can support the QoS update during the HO procedure (step 502-3). In another embodiment, the CN node can forward the indication from an Intermediate SMF (I-SMF) associated with the CN node to an SMF associated with the CN node (step 502-4). In another embodiment, the CN node can forward the indication from a Visited SMF (V-SMF) associated with the CN node to a Home SMF (H-SMF) associated with the CN node (step 502-5).

Figure 6:
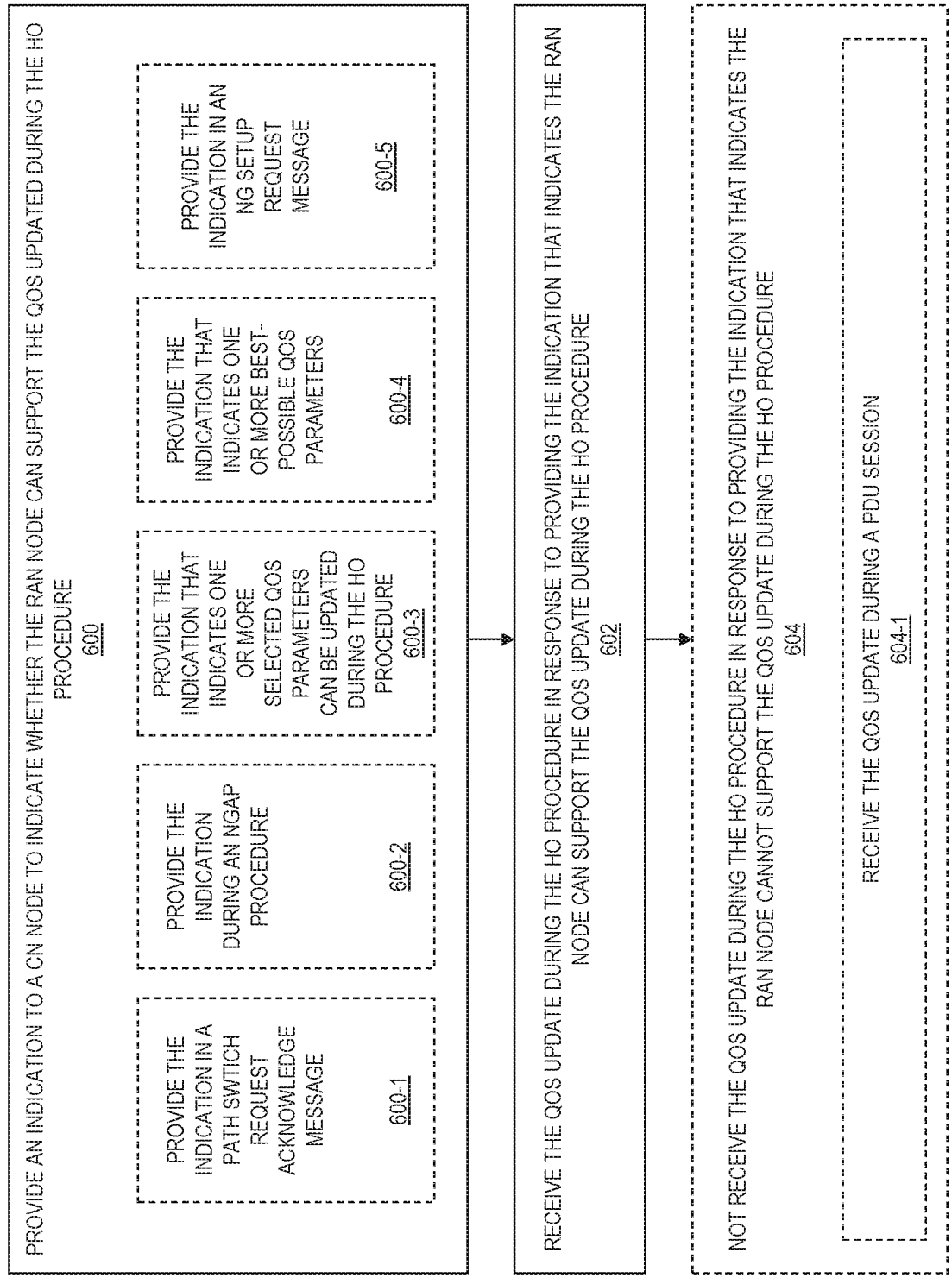
FIG. 6 is a flowchart of an exemplary method performed by a RAN node for supporting a QoS update during a HO procedure.

FIG. 6 is a flowchart of an exemplary method performed by a RAN node (e.g., the RAN node 102 in FIG. 1) for supporting a QoS update during a HO (e.g., Xn HO in 5G or X2 HO in EPS) procedure. Specifically, the RAN node is configured to provide an indication to a CN node (e.g., the CN node 110 in FIG. 1) to indicate whether the RAN node can support the QoS update during the HO procedure (step 400).

In one embodiment, the RAN node may provide the indication in a Path Switch Request Acknowledge message (e.g., in a "support for reception of additional QoS parameters" field) (step 600-1). In another embodiment, the RAN node may provide the indication during a NGAP procedure (step 600-2). In another embodiment, the RAN node may provide the indication that indicates one or more selected QoS parameters (e.g., CN Packet Delay Budget, PDB, and Traffic Characteristics, TCS) can be updated during the HO procedure (step 600-3). In another embodiment, the RAN node may provide the indication that indicates one or more best-possible QoS parameters the RAN node can support, wherein the indication is provided in a Path Switch Request message (e.g., in a "best QoS available" field or a "best RAN PDB" field) (step 600-4). In another embodiment, the RAN node may provide the indication in an NG Setup Request message (step 600-5).

Accordingly, the RAN node can receive the QoS update during the HO procedure in response to providing the indication that indicates the RAN node can support the QoS update during the HO procedure (step 602). Alternatively, the RAN node does not receive the QoS update during the HO procedure in response to providing the indication that indicates the RAN node cannot support the QoS update during the HO procedure (step 604). In this regard, the RAN node may receive the QoS update during a PDU session (step 604-1).

Figure 7:
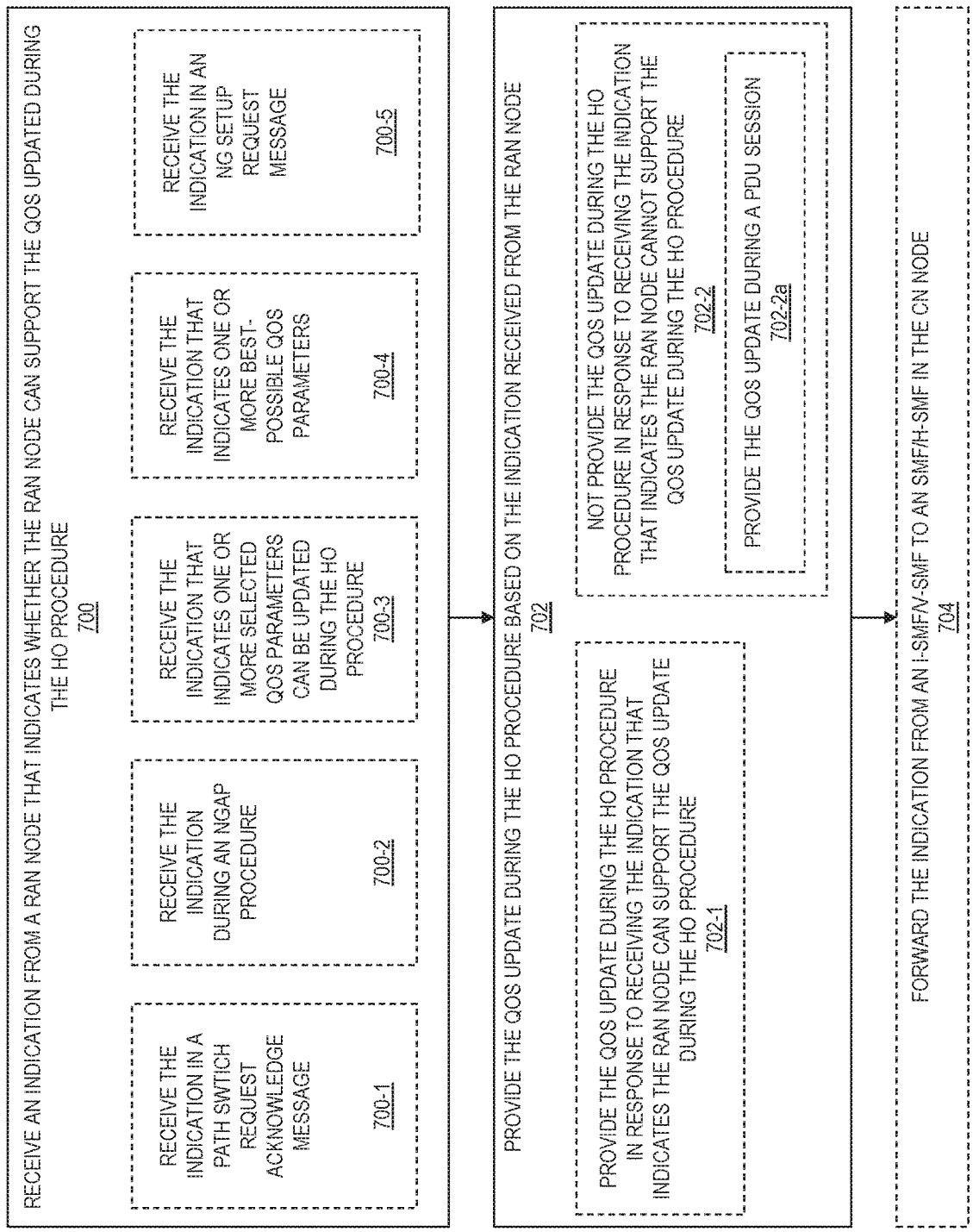
FIG. 7 is a flowchart of an exemplary method performed by a CN node for supporting a QoS update during a HO procedure.

FIG. 7 is a flowchart of an exemplary method performed by a CN node (e.g., the CN node 110 in FIG. 1) for supporting a QoS update during a HO (e.g., Xn HO in 5G or X2 HO in EPS) procedure. Specifically, the CN node receives an indication from a Radio Access Network, RAN, node that indicates whether the RAN node can support the QoS update during the HO procedure (step 700).

In one embodiment, the CN node may receive the indication in a Path Switch Request Acknowledge message (e.g., in a "support for reception of additional QoS parameters" field) (step 700-1). In another embodiment, the CN node may receive the indication during a NGAP procedure (step 700-2). In another embodiment, the CN node may receive the indication that indicates one or more selected QoS parameters (e.g., CN Packet Delay Budget, PDB, and Traffic Characteristics, TCS) can be updated during the HO procedure (step 700-3). In another embodiment, the CN node may receive the indication that indicates one or more best-possible QoS parameters the RAN node can support, wherein the indication is provided in a Path Switch Request message (e.g., in a "best QoS available" field or a "best RAN PDB" field) (step 700-4). Accordingly, the CN node may determine a UPF based on the best possible QoS parameters in the indication. In another embodiment, the CN node may receive the indication in an NG Setup Request message (step 700-5).

Accordingly, the CN node can provide the QoS update based on the indication received from the RAN node (step 702). In one non-limiting example, the CN node provides the QoS update during the HO procedure in response to receiving the indication that indicates the RAN node can support the QoS update during the HO procedure (step 702-1). In another non-limiting example, the CN node does not provide the QoS update during the HO procedure in response to receiving the indication that indicates the RAN node cannot support the QoS update during the HO procedure (step 702-2). In this regard, the CN node may provide the QoS update during a PDU session (step 702-2a).

In a non-limiting example, the indication can be received by an I-SMF/V-SMF in the CN node. In this regard, the CN node may be configured to forward the indication from the I-SMF/V-SMF to an SMF/H-SMF in the CN node (step 704).

Specific embodiments of the present disclosure with respect to supporting QoS update during a HO procedure are discussed in detail below.

Solution 1

In an embodiment related to providing (400) the indication to the CN node, an NG-RAN node shall provide an indication to a CN node that indicates the RAN node is capable of receiving and handling additional parameters (e.g., CN PDB) provided by the CN node (e.g., via an NGAP Path Switch Request Acknowledge message). The RAN node may provide the indication in a message transmitted from the RAN node to the CN node (e.g., in the NGAP Path Switch Request), as illustrated in FIG. 8 (e.g., steps 400-1, 500-1).

In another embodiment related to providing (400) the indication to the CN node, the NG-RAN node can indicate the support during NGAP setup procedure (e.g., steps 400-4, 500-4).

In another embodiment related to providing (400) the indication to the CN node, the NG-RAN node can indicate the support for selected parameter updates during the Xn Handover, such as CN PDB and Traffic Characteristics (TSC) (e.g., steps 400-3, 500-3).

As a result of providing (400) the indication to the CN node, the CN node can determine whether additional parameters can be provided to the NG-RAN as part of the Xn HO procedure or as part of a separate PDU session modification procedure.

Solution 2

In another embodiment related to providing (400) the indication to the CN node, the NG-RAN node indicates to the CN node a best QoS parameter(s) (e.g., the RAN side PDB that the NG-RAN can support) when the best QoS parameter(s) is better than the originally required QoS parameters. This serves an indication to the CN node as to what the NG-RAN node can best perform. In a non-limiting example, the indication can be provided by introducing a "best QoS available" or a "best RAN PDB" field in a message sent from the RAN node to the CN node (e.g., Path Switch Request message).

After receiving (500) the indication from the RAN node, the CN node (e.g., SMF) may calculate the longest-possible CN PDB and select a UPF that can fulfill the QoS requirement.

Figure 9:
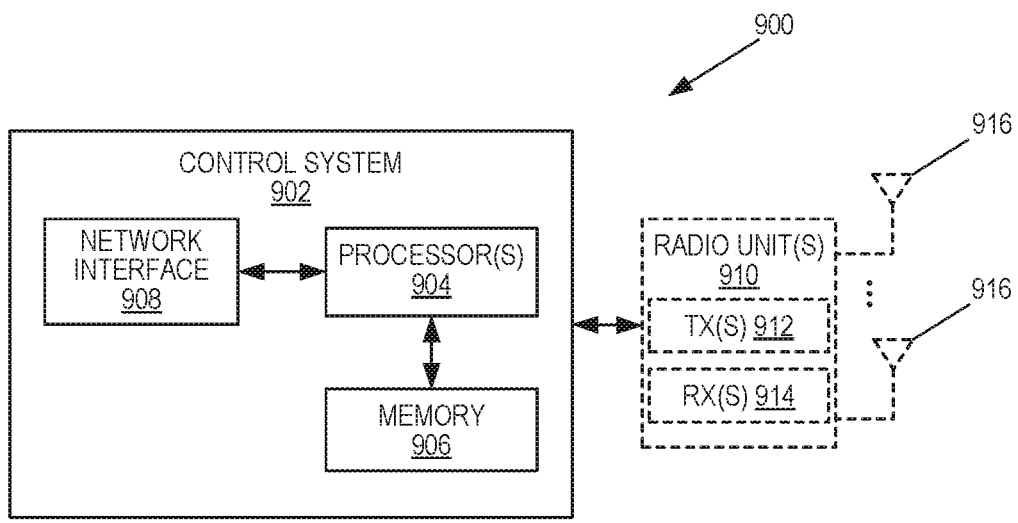
FIG. 9 is a schematic block diagram of a radio access node according to some embodiments of the present disclosure.

FIG. 9 is a schematic block diagram of a radio access node 900 according to some embodiments of the present disclosure. Optional features are represented by dashed boxes. The radio access node 900 may be, for example, a base station 102 or 106 or a network node that implements all or part of the functionality of the base station 102 or gNB described herein. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
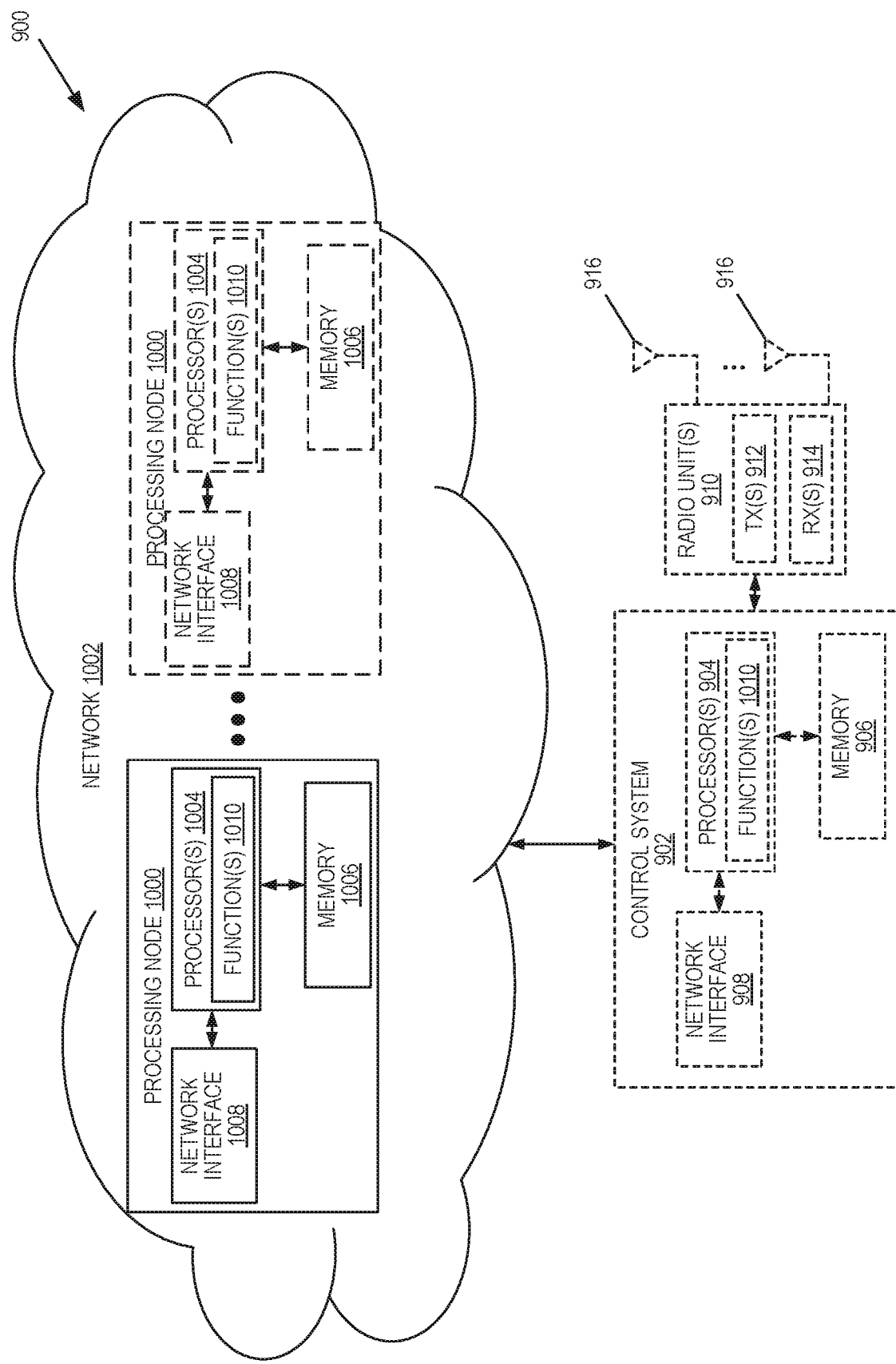
FIG. 10 is a schematic block diagram that illustrates a virtualized embodiment of the radio access node according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 may include the control system 902 and/or the one or more radio units 910, as described above. The control system 902 may be connected to the radio unit(s) 910 via, for example, an optical cable or the like. The radio access node 900 includes one or more processing nodes 1000 coupled to or included as part of a network(s) 1002. If present, the control system 902 or the radio unit(s) is connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicates directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
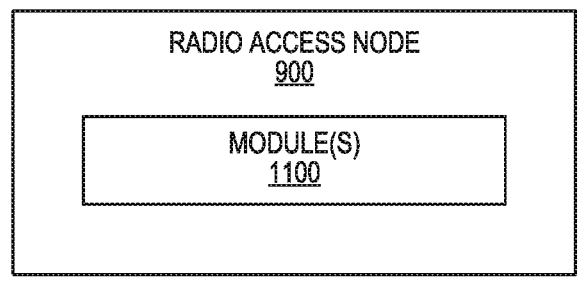
FIG. 11 is a schematic block diagram of the radio access node according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
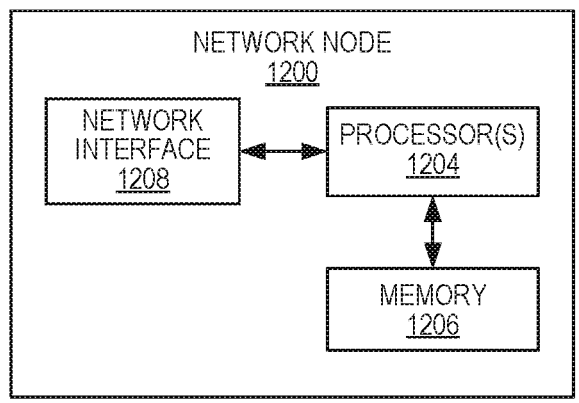
FIG. 12 is a schematic block diagram of a network node according to some embodiments of the present disclosure.

FIG. 12 is a schematic block diagram of a network node 1200 according to some embodiments of the present disclosure. The network node 1200 may be, for example, a core network node (e.g., SMF, I-SMF, V-SMF, H-SMF). As illustrated, the network node 1200 includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. The one or more processors 1204 operate to provide one or more functions of the network node 1200 as described herein (e.g., one or more functions of SMF, I-SMF, V-SMF, H-SMF as described herein). In some embodiments, the function(s) are implemented in software that is stored, e.g., in the memory 1206 and executed by the one or more processors 1204.

Figure 13:
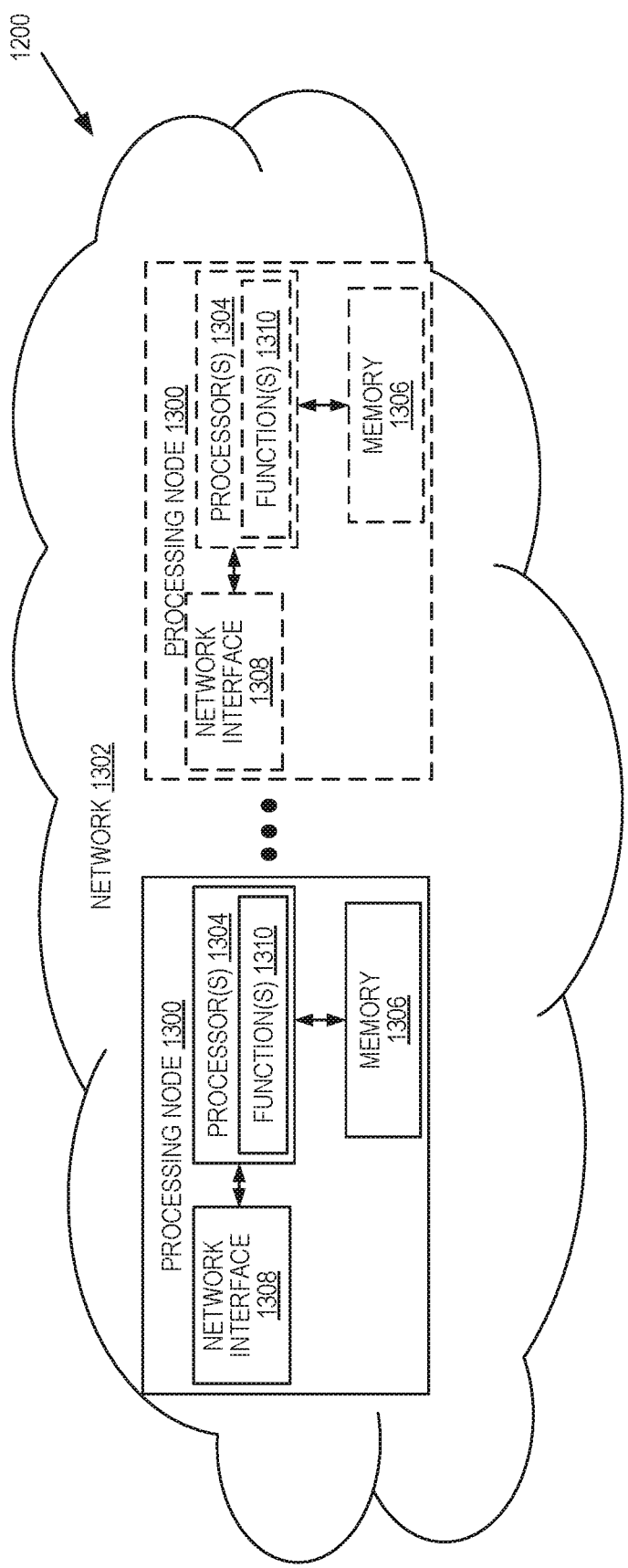
FIG. 13 is a schematic block diagram that illustrates a virtualized embodiment of the network node according to some embodiments of the present disclosure.

FIG. 13 is a schematic block diagram that illustrates a virtualized embodiment of the network node 1200 according to some embodiments of the present disclosure. Optional features are represented by dashed boxes. As used herein, a "virtualized" network node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes one or more processing nodes 1300 coupled to or included as part of a network(s) 1302. Each processing node 1300 includes one or more processors 1304 (e.g., CPUs, ASICs, FPGAs, and/or the like), memory 1306, and a network interface 1308. In this example, functions 1310 of the network node 1200 described herein (e.g., one or more functions of SMF, I-SMF, V-SMF, H-SMF as described herein) are implemented at the one or more processing nodes 1300 or distributed across the two or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300.

In some embodiments, a computer program including instructions which, when executed by at least one processor, causes the at least one processor to carry out the functionality of the network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
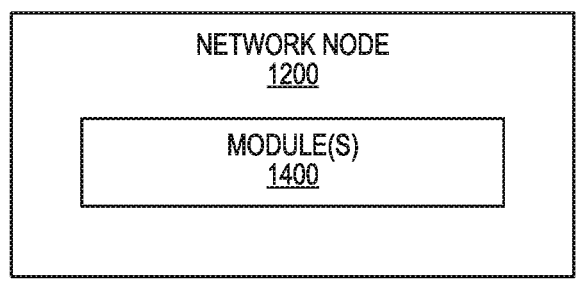
FIG. 14 is a schematic block diagram of the network node according to some other embodiments of the present disclosure.

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300.

Specific changes are further described in detail in the Change Requests (CRs) for 23.502 and 38.413, as provided below.

Change Request 38.413 CR 8.4.4 Path Switch Request (e.g., steps 400-1, 500-1)
8.4.4.1 General The purpose of the Path Switch Request procedure is to establish a UE associated signalling connection to the 5GC and, if applicable, to request the switch of the downlink termination point of the NG-U transport bearer towards a new termination point.

8.4.4.2 Successful Operation

Figure 15:
FIG. 15 illustrates a path switch request for a successful operation.

Refer to FIG. 15, which illustrates a pass switch request of a successful operation. The NG-RAN node initiates the procedure by sending the PATH SWITCH REQUEST message to the AMF. Upon reception of the PATH SWITCH REQUEST message the AMF shall, for each PDU session indicated in the PDU Session ID IE, transparently transfer the Path Switch Request Transfer IE to the SMF associated with the concerned PDU session.

When the NG-RAN node has received from the radio interface the RRC Resume Cause IE, it shall include it in the PATH SWITCH REQUEST message.

After all necessary updates including the UP path switch have been successfully completed in the 5GC for at least one of the PDU session resources included in the PATH SWITCH REQUEST, the AMF shall send the PATH SWITCH REQUEST ACKNOWLEDGE message to the NG-RAN node and the procedure ends.

The list of accepted QoS flows shall be included in the PATH SWITCH REQUEST message within the Path Switch Request Transfer IE. The SMF shall handle this information as specified in TS 23.502.

For each PDU session for which the Additional DL QoS Flow per TNL Information IE is included in the Path Switch Request Transfer IE of the PATH SWITCH REQUEST message, the SMF may use each included UP transport layer information as the downlink termination point for the included associated QoS flows for this PDU session split in different tunnels.

The list of PDU sessions which failed to be setup, if any, shall be included in the PATH SWITCH REQUEST message within the Path Switch Request Setup Failed Transfer IE. The AMF shall handle this information as specified in TS 23.502.

For each PDU session for which the User Plane Security Information IE is included in the Path Switch Request Transfer IE of the PATH SWITCH REQUEST message, the SMF shall behave as specified in TS 33.501 and may send back the Security Indication IE within the Path Switch Request Acknowledge Transfer IE of the PATH SWITCH REQUEST ACKNOWLEDGE message.

For each PDU session for which the DL NG-U TNL Information Reused IE set to "true" is included in the Path Switch Request Transfer IE of the PATH SWITCH REQUEST message, the SMF shall, if supported, consider that the DL TNL information contained in the DL NG-U UP TNL Information IE has been reused.

For each PDU session for which the Additional Redundant DL QoS Flow per TNL Information IE is included in the Path Switch Request Transfer IE of the PATH SWITCH REQUEST message, the SMF may use each included UP transport layer information as the downlink termination point for the included associated QoS flows for this PDU session split in different tunnels for the redundant transmission.

For each PDU session for which the Redundant DL NG-U TNL Information Reused IE is included in the Path Switch Request Transfer IE of the PATH SWITCH REQUEST message, the SMF shall, if supported, consider the included DL transport layer address as the DL transport layer address for the redundant transmission as specified in TS 23.501.

For each PDU session for which the Global RAN Node ID of Secondary NG-RAN Node IE is included in the Path Switch Request Transfer IE of the PATH SWITCH REQUEST message, the SMF shall, if supported, handle this information as specified in TS 23.501.

For each PDU session included in the PATH SWITCH REQUEST message, if the Current QoS Parameters Set Index IE is included in the Path Switch Request Transfer IE the SMF shall consider it as the currently fulfilled QoS parameters set among the alternative QoS parameters for the involved QoS flow.

For each PDU session for which the support for reception of additional QoS parameters IE is included in the Path Switch Request Transfer IE of the PATH SWITCH REQUEST message, the SMF shall, if supported, handle this information as specified in TS 23.501.

If the Security Indication IE is included within the Path Switch Request Acknowledge Transfer IE of the PATH SWITCH REQUEST ACKNOWLEDGE message, the NG-RAN node shall behave as specified in TS 33.501.

If the UL NG-U UP TNL Information IE is included within the Path Switch Request Acknowledge Transfer IE of the PATH SWITCH REQUEST ACKNOWLEDGE message, the NG-RAN node shall store this information and use it as the uplink termination point for the user plane data for this PDU session.

If the Additional NG-U UP TNL Information IE is included within the Path Switch Request Acknowledge Transfer IE of the PATH SWITCH REQUEST ACKNOWLEDGE message, the NG-RAN node shall store this information and use the included UL NG-U UP TNL Information IE(s) as the uplink termination point(s) of the user plane data for this PDU session split in different tunnels.

If the Redundant UL NG-U UP TNL Information IE is included within the Path Switch Request Acknowledge Transfer IE of the PATH SWITCH REQUEST ACKNOWLEDGE message, the NG-RAN node shall store this information and use it as the uplink termination point for the user plane data for the redundant transmission for this PDU session as specified in TS 23.501.

If the Additional Redundant NG-U UP TNL Information IE is included within the Path Switch Request Acknowledge Transfer IE of the PATH SWITCH REQUEST ACKNOWLEDGE message, the NG-RAN node shall store this information and use the included UL NG-U UP TNL Information IE(s) as the uplink termination point(s) of the user plane data for this PDU session split in different tunnels.

If the Core Network Assistance Information for RRC INACTIVE IE is included in the PATH SWITCH REQUEST ACKNOWLEDGE message, the NG-RAN node shall, if supported, store this information in the UE context and use it for e.g., the RRC_INACTIVE state decision and RNA configuration for the UE and RAN paging if any for a UE in RRC_INACTIVE state, as specified in TS 38.300.

If the CN Assisted RAN Parameters Tuning IE is included in the PATH SWITCH REQUEST ACKNOWLEDGE message, the NG-RAN node may use it as described in TS 23.501.

If the RRC Inactive Transition Report Request IE is included in the PATH SWITCH REQUEST ACKNOWLEDGE message, the NG-RAN node shall, if supported, store this information in the UE context.

If the New Security Context Indicator IE is included in the PATH SWITCH REQUEST ACKNOWLEDGE message, the NG-RAN node shall use the information as specified in TS 33.501.

Upon reception of the PATH SWITCH REQUEST ACKNOWLEDGE message the NG-RAN node shall store the received Security Context IE in the UE context and the NG-RAN node shall use it as specified in TS 33.501.

If the UE Security Capabilities IE is included in the PATH SWITCH REQUEST ACKNOWLEDGE message, the NG-RAN node shall handle it accordingly (TS 33.501).

If the Redirection for Voice EPS Fallback IE is included in the PATH SWITCH REQUEST ACKNOWLEDGE message, the NG-RAN node shall, if supported, store it and use it in a subsequent decision of EPS fallback for voice as specified in TS 23.502.

If the PDU Session Resource Released List IE is included in the PATH SWITCH REQUEST ACKNOWLEDGE message, the NG-RAN node shall release the corresponding QoS flows and regard the PDU session(s) indicated in the PDU Session Resource Released List IE as being released. The appropriate cause value for each PDU session released is included in the Path Switch Request Unsuccessful Transfer IE contained in the PATH SWITCH REQUEST ACKNOWLEDGE message.

If the SRVCC Operation Possible IE is included in the PATH SWITCH REQUEST ACKNOWLEDGE message, the NG-RAN node shall, if supported, store the content of the received SRVCC Operation Possible IE in the UE context and use it as defined in TS 23.216.

If the Enhanced Coverage Restriction IE is included in the PATH SWITCH REQUEST ACKNOWLEDGE message, the NG-RAN node shall, if supported, store this information in the UE context and use it as defined in TS 23.501.

If the Extended Connected Time IE is included in the PATH SWITCH REQUEST ACKNOWLEDGE message, the NG-RAN node shall, if supported, use it as described in TS 23.501.

If the UE Differentiation Information IE is included in the PATH SWITCH REQUEST ACKNOWLEDGE message, the NG-RAN node shall, if supported, store this information in the UE context for further use according to TS 23.501.

If the NR V2X Services Authorized IE is contained in the PATH SWITCH REQUEST ACKNOWLEDGE message, the NG-RAN node shall, if supported, update its NR V2X services authorization information for the UE accordingly. If the NR V2X Services Authorized IE includes one or more IEs set to "not authorized", the NG-RAN node shall, if supported, initiate actions to ensure that the UE is no longer accessing the relevant service(s).

If the LTE V2X Services Authorized IE is contained in the PATH SWITCH REQUEST ACKNOWLEDGE message, the NG-RAN node shall, if supported, update its LTE V2X services authorization information for the UE accordingly. If the LTE V2X Services Authorized IE includes one or more IEs set to "not authorized", the NG-RAN node shall, if supported, initiate actions to ensure that the UE is no longer accessing the relevant service(s).

If the NR UE Sidelink Aggregate Maximum Bit Rate IE is included in the PATH SWITCH REQUEST ACKNOWLEDGE message, the NG-RAN node shall, if supported:
 replace the previously provided UE Sidelink Aggregate Maximum Bit Rate, if available in the UE context, with the received value;
 use the received value for the concerned UE's sidelink communication in network scheduled mode for NR V2X services.

If the LTE UE Sidelink Aggregate Maximum Bit Rate IE is included in the PATH SWITCH REQUEST ACKNOWLEDGE message, the NG-RAN node shall, if supported:
 replace the previously provided UE Sidelink Aggregate Maximum Bit Rate, if available in the UE context, with the received value;
 use the received value for the concerned UE's sidelink communication in network scheduled mode for LTE V2X services.

If the PC5 QoS Parameters IE is included in the PATH SWITCH REQUEST ACKNOWLEDGE message, the NG-RAN node shall, if supported, use it as defined in TS 23.287.

If the CE-mode-B Restricted IE is included in the PATH SWITCH REQUEST ACKNOWLEDGE message and the Enhanced Coverage Restriction IE is not set to "restricted" and the Enhanced Coverage Restriction information stored in the UE context is not set to "restricted", the NG-RAN node shall, if supported, store this information in the UE context and use it as defined in TS 23.501.

If the UE User Plane CIoT Support Indicator IE is included in the PATH SWITCH REQUEST ACKNOWLEDGE message the NG-RAN node shall, if supported, store this information in the UE context and consider that User Plane CIoT 5GS Optimisation as specified in TS 23.501 is supported for the UE.

If the PATH SWITCH REQUEST ACKNOWLEDGE message contains the UE Radio Capability ID IE, the NG-RAN node shall, if supported, use it as specified in TS 23.501 and TS 23.502.

Interactions with RRC Inactive Transition Report Procedure:

If the RRC Inactive Transition Report Request IE is included in the PATH SWITCH REQUEST ACKNOWLEDGE message and set to "single RRC connected state report" and the UE is in RRC_CONNECTED state, the NG-RAN node shall, if supported, send one RRC INACTIVE TRANSITION REPORT message to the AMF to report the RRC state of the UE.

If the RRC Inactive Transition Report Request IE is included in the PATH SWITCH REQUEST ACKNOWLEDGE message and set to "single RRC connected state report" and the UE is in RRC_INACTIVE state, the NG-RAN node shall, if supported, send to the AMF one RRC INACTIVE TRANSITION REPORT message plus one subsequent RRC INACTIVE TRANSITION REPORT message when the RRC state transitions to RRC_CONNECTED state.

If the RRC Inactive Transition Report Request IE is included in the PATH SWITCH REQUEST ACKNOWLEDGE message and set to "subsequent state transition report", the NG-RAN node shall, if supported, send one RRC INACTIVE TRANSITION REPORT message to the AMF to report the RRC state of the UE and subsequent RRC INACTIVE TRANSITION REPORT messages to report the RRC state of the UE when the UE enters or leaves RRC_INACTIVE state.

9.2.3.8 Path Switch Request

FIG. 16 illustrates a message sent by the NG-RAN node to inform the AMF of the new serving NG-RAN node and to transfer some NG-U DL tunnel termination point(s) to the SMF via the AMF for one or multiple PDU session resources. Direction: NG-RAN node→AMF.

9.2.3.9 Path Switch Request Acknowledge

FIG. 17 illustrates a message sent by the AMF to inform the NG-RAN node that the path switch has been successfully completed in the 5GC. Direction: AMF→NG-RAN node.

9.3.4.8 Path Switch Request Transfer

An IE as shown in FIG. 8 is transparent to the AMF.

Change Request 38.413 CR 2348

4.9.1.2.2 Xn Based Inter NG-RAN Handover without User Plane Function Re-Allocation This procedure is used to hand over a UE from a source NG-RAN to target NG-RAN using Xn when the AMF is unchanged and the SMF decides to keep the existing UPF. The UPF referred in this clause 4.9.1.2.2 is the UPF which terminates N3 interface in the 5GC for non-roaming or local breakout roaming scenario, V-UPF which terminates N3 interface in 5GC for home routed roaming scenario. The SMF referred in this clause 4.9.1.2.2 is the V-SMF for home routed roaming scenario. The presence of IP connectivity between the Source UPF and Target NG-RAN is assumed.

Figure 18:
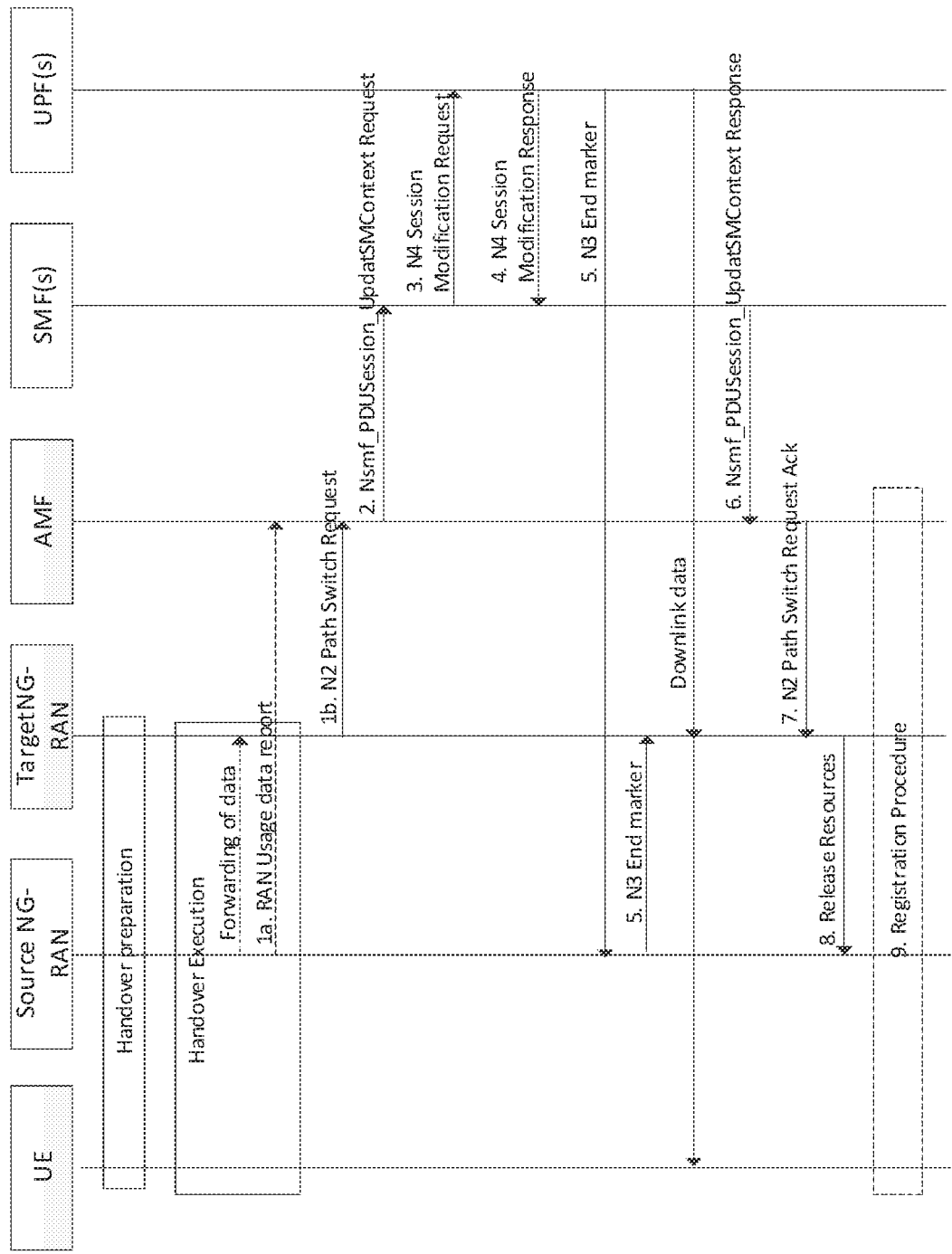
FIG. 18 is a signal diagram illustrating Xn based inter NG-RAN handover with User Plane Function (UPF) re-allocation.

The call flow is shown in FIG. 18.

1a. If the PLMN has configured secondary RAN usage reporting, the source NG-RAN node during the handover execution phase may provide a RAN usage data Report (N2 SM Information (Secondary RAN usage data), Handover Flag, Source to Target transparent container) to the AMF. The source NG-RAN node shall provide this only when the Target NG-RAN has confirmed handover over Xn interface. The Handover Flag indicates to the AMF that it should buffer the N2 SM Information containing the usage data report before forwarding it.

If the source NG RAN and target NG RAN support RACS as defined in TS 23.501, the source NG-RAN provides the UE's UE Radio Capability ID to the target NG-RAN. If the source NG-RAN has knowledge that the target NG-RAN might not have a local copy of the Radio Capability corresponding to the UE Radio Capability ID (i.e., because the source NG-RAN had itself to retrieve the UE's Radio Capability from the AMF) then the source NG-RAN may also send some or all of the UE's Radio Capability to the target NG-RAN (the size limit based on local configuration) in Xn signalling as defined in TS 38.423. In the case of inter-PLMN handover, when the source and target NG-RAN support RACS as defined in TS 23.501 and the source NG-RAN determines based on local configuration that the target PLMN does not support the UE Radio Capability ID assigned by the source PLMN, then the source NG-RAN shall provide the UE radio access capabilities to the target NG-RAN and shall not send the UE Radio Capability ID. If, as permitted in TS 38.423, the target NG-RAN during the handover preparation received the UE radio access capabilities but did not receive the UE Radio Capability ID, NG-RAN shall proceed with handover using the received UE radio access capabilities. If the target NG-RAN received both the UE radio access capabilities and the UE Radio Capability ID, then the target NG-RAN shall use any locally stored UE radio access capability information corresponding to the UE Radio Capability ID. If none are stored locally, the target NG-RAN may request the full UE radio access capability information from the core network. If the full UE radio access capability information is not promptly received from the core network, or the target NG-RAN chooses not to request them, then the target NG-RAN shall proceed with the UE radio access capabilities sent by the source NG-RAN. The target NG-RAN shall not use the UE radio access capability information received from the source NG-RAN for any other UE with the same the UE Radio Capability ID.

1b. Target NG-RAN to AMF: N2 Path Switch Request (List of PDU Sessions To Be Switched with N2 SM Information, List of PDU Sessions that failed to be established with the failure cause given in the N2 SM information element, UE Location Information)

The Target NG-RAN sends an N2 Path Switch Request message to an AMF to inform that the UE has moved to a new target cell and provides a List Of PDU Sessions To Be Switched. AN Tunnel Info for each PDU Session to be switched is included in the N2 SM Information.

If redundant transmission is performed for one or more QoS Flows in the PDU Session, two AN Tunnel Info are provided by the Target NG-RAN and the Target NG-RAN indicates to the SMF one of the AN Tunnel Info is used as the redundancy tunnel of the PDU Session as described in clause 5.33.2.2 of TS 23.501 [2]. If only one AN Tunnel Info is provided by the Target NG-RAN for the PDU session, the SMF may release these QoS Flows by triggering PDU Session Modification procedure as specified in clause 4.3.3 after the handover procedure.

The serving PLMN ID is included in the message. The target NG-RAN shall include the PDU Session in the PDU Sessions Rejected list:
    If none of the QoS Flows of a PDU Session are accepted by the Target NG-RAN; or
    If the corresponding network slice is not supported in the Target NG-RAN; or
    When the NG-RAN cannot set up user plane resources fulfilling the User Plane Security Enforcement with a value Required, the NG-RAN rejects the establishment of user plane resources for the PDU Session.

If the NG-RAN cannot set up user plane resources fulfilling the User Plane Security Enforcement with a value Preferred, the NG-RAN establishes the user plane resources for the PDU session and shall include the PDU Session in the PDU Sessions Modified list.

PDU Sessions Rejected contains an indication of whether the PDU session was rejected because User Plane Security Enforcement is not supported in the Target NG-RAN. Depending on the type of target cell, the Target NG-RAN includes appropriate information in this message.

For the PDU Sessions to be switched to the Target NG-RAN, the N2 Path Switch Request message shall include the list of accepted QoS Flows. For each QoS Flow accepted with an Alternative QoS Profile as specified in TS 23.501 [2], the N2 SM Information shall include a reference to the fulfilled Alternative QoS Profile. The Target NG-RAN may also include indication of support for reception of additional parameters (e.g., CN PDB) in Path Switch Request Acknowledge.

2. AMF to SMF: Nsmf_PDUSession_UpdateSMContext Request (N2 SM information received from T-RAN in step 1b and N2 SM Information from source NG-RAN (Secondary RAT usage data), UE Location Information, UE presence in LADN service area). The N2 SM Information here from source NG-RAN is the one buffered at step 1a when applicable.

The AMF sends N2 SM information by invoking the Nsmf_PDUSession_UpdateSMContext request service operation for each PDU Session in the lists of PDU Sessions received in the N2 Path Switch Request.

The Nsmf_PDUSession_UpdateSMContext Request contains either an indication that the PDU Session Is To Be Switched (together with information on the N3 addressing to use and on the transferred QoS flows) or an indication that the PDU Session is to be Rejected (together with a rejection cause).

For a PDU Sessions to be switched to the Target NG-RAN, upon receipt of the Nsmf_PDUSession_UpdateSMContext request, the SMF determines whether the existing UPF can continue to serve the UE. If the existing UPF cannot continue to serve the UE, steps 3-11 of clause 4.9.1.2.3 or 4.9.1.2.4 are performed depending on whether the existing UPF is a PDU Session Anchor. Otherwise, the following steps 3 to 6 are performed if the existing UPFs can continue to serve the PDU Session.

In the case that the AMF determines that the PDU Session is related to a LADN, then the AMF provides the "UE presence in LADN service area" to the SMF. If the AMF does not provide the "UE presence in LADN service area" indication and the SMF determines that the DNN corresponds to a LADN, then the SMF considers that the UE is OUT of the LADN service area. The SMF takes actions for the LADN PDU Session as defined in TS 23.501 clause 5.6.5 based on the "UE presence in LADN service area" indication.

If a PDU Session is rejected by the Target NG-RAN with an indication that the PDU session was rejected because User Plane Security Enforcement is not supported in the Target NG-RAN and the User Plane Enforcement Policy indicates "Required" as described in clause 5.10.3 of TS 23.501, the SMF triggers the release of this PDU Session. In all other cases of PDU Session rejection, the SMF can decide whether to release the PDU Session or to deactivate the UP connection of this PDU Session.

If some of the QoS Flows of a PDU Session are not accepted by the Target NG-RAN, the SMF shall initiate the PDU Session Modification procedure to remove the non-accepted QoS Flows from the PDU Session(s) after the handover procedure is completed.

For the PDU Session(s) that do not have active N3 UP connections before handover procedure, the SMF(s) keep the inactive status after handover procedure.

If the UE moves into a non-Allowed Area, the AMF also notifies via Namf_EventExposure_Notify to each NF Consumer (e.g., SMFs of the established PDU Sessions) which has subscribed for UE reachability event, that the UE is only reachable for regulatory prioritized services. The SMF then deactivates the PDU session if this PDU Session is not for emergency service.

3. SMF to UPF: N4 Session Modification Request (AN Tunnel Info) For PDU Sessions that are modified by the Target NG-RAN, the SMF sends an N4 Session Modification Request message to the UPF. The SMF may notify the UPF that originated the Data Notification to discard downlink data for the PDU Sessions and/or to not provide further Data Notification messages.

Depending on the network deployment, the CN Tunnel Info of UPF used for connection to Target NG-RAN and connection to Source NG-RAN may be different, e.g., due to Source and Target NG-RAN are in different IP domains. In this case the SMF may ask the UPF to allocate new CN Tunnel Info, providing the target Network Instance.

4. UPF to SMF: N4 Session Modification Response (CN Tunnel Info) For the PDU Sessions that are switched, the UPF returns an N4 Session Modification Response message to the SMF after requested PDU Sessions are switched. Tunnel identifiers for UL traffic are included only for PDU Sessions whose user plane resources are not being released, and was requested by the SMF. If redundant transmission is performed for one or more QoS Flows of a PDU Session and different CN Tunnel Info were requested by the SMF, the UPF allocates two different CN Tunnel Info and indicates the SMF that one CN Tunnel Info is used as the redundancy tunnel of the PDU session as described in clause 5.33.2.2 of TS 23.501. For the PDU Sessions that are deactivated, the UPF returns an N4 Session Modification Response message to the SMF after the N3 (R)AN tunnel information is released.

5. In order to assist the reordering function in the Target NG-RAN, the UPF (as specified in TS 23.501 [2], clause 5.8.2.9) sends one or more "end marker" packets for each N3 tunnel on the old path immediately after switching the path. The UPF starts sending downlink packets to the Target NG-RAN.

6. SMF to AMF: Nsmf_PDUSession_UpdateSMContext Response (N2 SM information) The SMF sends an Nsmf_PDUSession_UpdateSMContext response (N2 SM Information (CN Tunnel Info, updated QoS parameters for the accepted QoS Flows)) to the AMF for PDU Sessions which have been switched successfully. The CN Tunnel Info of UPF send to AMF is used to setup N3 tunnel. If redundant transmission is performed for one or more QoS Flows of a PDU Session, two CN Tunnel Info are sent and the SMF indicates to the Target NG-RAN one of the CN Tunnel Info is used as the redundancy tunnel of the PDU Session as described in clause 5.33.2.2 of TS 23.501. The SMF sends an Nsmf_PDUSession_UpdateSMContext response without including the CN Tunnel Info to the AMF for the PDU Sessions for which user plane resources are deactivated or released, and then the SMF releases the PDU Session(s) which is to be released using a separate procedure as defined in clause 4.3.4. For each accepted GBR QoS Flow of Delay-critical resource type, the dynamic CN PDB may be updated and sent to the Target NG-RAN by the SMF, either as part of the current procedure or using separate procedure as specified in clause 4.3.3 PDU Session Modification based on the indication in step 1b above.

If the Source NG-RAN does not support Alternative QoS Profiles (see TS 23.501) and the Target NG-RAN supports them, the SMF sends the Alternative QoS Profiles (see TS 23.501) to the Target NG-RAN on a per QoS Flow basis, if available.

NOTE: Step 6 can occur any time after receipt of N4 Session Modification Response at the SMF.

7. AMF to NG-RAN: N2 Path Switch Request Ack (N2 SM Information, Failed PDU Sessions, UE Radio Capability ID).

Once the Nsmf_PDUSession_UpdateSMContext response is received from all the SMFs, the AMF aggregates received CN Tunnel Info and sends this aggregated information as a part of N2 SM Information along with the Failed PDU Sessions in N2 Path Switch Request Ack to the Target NG-RAN. If none of the requested PDU Sessions have been switched successfully, the AMF shall send an N2 Path Switch Request Failure message to the Target NG-RAN.

If the UE Radio Capability ID is included in the N2 Path Switch Request Ack message, when there are no corresponding UE radio capabilities set for UE Radio Capability ID at the target NR-RAN, the target NG-RAN shall request the AMF to provide the UE radio capabilities set corresponding to UE Radio Capability ID to the target NG-RAN.

8. By sending a Release Resources message to the Source NG-RAN, the Target NG-RAN confirms success of the handover. It then triggers the release of resources with the Source NG-RAN.

9. [Conditional] The UE may initiate Mobility Registration Update procedure if one of the triggers of registration procedure applies as described in clause 4.2.2.2.2. In this case, only steps 1, 2, 3, 17 and 21 in clause 4.2.2.2.2 are performed.

For the mobility related events as described in clause 4.15.4, the AMF invokes the Namf_EventExposure_Notify service operation.

Upon reception of the Namf_EventExposure_Notify with an indication that UE is reachable only for regulatory prioritized service, the SMF deactivates the PDU Session if the service of the PDU Session is not regulatory prioritized. For home routed roaming case, the V-SMF triggers the deactivation of the PDU Session, in addition, the H-SMF refrains from sending downlink signaling if the signaling is not related to regulatory prioritized service upon receiving the notification.

4.23.11.2 Xn Based Handover with Insertion of Intermediate SMF

This procedure is used to hand over a UE from a Source NG-RAN to a Target NG-RAN using Xn interface (in this case the AMF is unchanged) and the AMF decides that insertion of a new intermediate I-SMF is needed. This procedure is used for non-roaming or local breakout roaming scenario.

Figure 19:
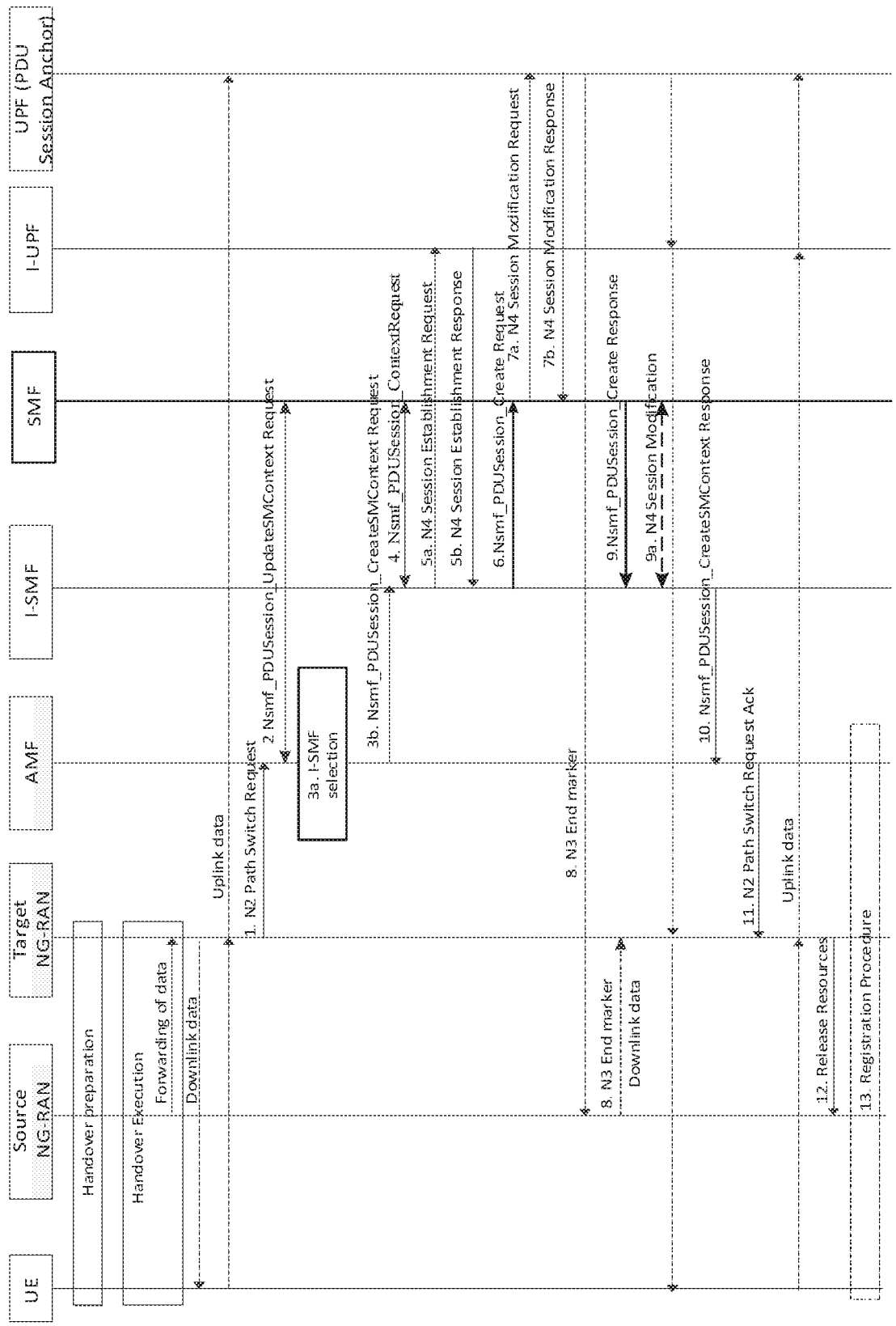
FIG. 19 is a signal diagram illustrating Xn based inter NG-RAN handover with insertion of Intermediate Session Management Function (I-SMF)

The call flow is shown in FIG. 19.

1. Step 1 is the same as described in clause 4.9.1.2.2.
2. For each PDU Session Rejected in the list of PDU Sessions received in the N2 Path Switch Request, the AMF perform same step as step 2 in clause 4.9.1.2.2.

The rest of this procedure applies for each PDU Session To Be Switched.

3a. The AMF checks if an I-SMF needs to be selected as described in clause 5.35.3 of TS 23.501.

3b. If a new I-SMF is selected the AMF sends Nsmf_PDUSession_CreateSMContext Request (SUPI, AMF ID, SMF ID, SM Context ID, PDU Session To Be Switched with N2 SM Information (Secondary RAT usage data), UE Location Information, UE presence in LADN service area, indication of the support for reception of additional parameters) to the new selected I-SMF.

4. The new I-SMF sends Nsmf_PDUSession_Context Request (SM context type, SM Context ID) to SMF to retrieve the SM Context.

The new I-SMF uses SM Context ID received from AMF for this service operation. SM context type indicates that the requested information is all SM context, i.e., PDN Connection Context and 5G SM context. The SM Context ID is used by the recipient of Nsmf_PDUSession_Context Request in order to determine the targeted PDU Session.

5a. I-SMF to I-UPF: N4 Session Establishment Request (Target NG-RAN Tunnel Info).

The I-SMF then selects a I-UPF based on UPF Selection Criteria according to clause 6.3.3 of TS 23.501. An N4 Session Establishment Request message is sent to the I-UPF. The target NG-RAN Tunnel Info is included in the N4 Session Establishment Request message.

5b. I-UPF to I-SMF: N4 Session Establishment Response.
The I-UPF sends an N4 Session Establishment Response message to the I-SMF.
The UL CN Tunnel Info and DL CN Tunnel Info of I-UPF are sent to the I-SMF.

6. I-SMF to SMF: Nsmf_PDUSession_Create Request to the SMF (SUPI, PDU Session ID, Secondary RAT usage data, UE Location Information, UE presence in LADN service area, DL CN Tunnel Info of the I-UPF, DNAI list supported by the I-SMF, additional parameters supporting indicator for Xn HO).
The I-SMF provides the DNAI list it supports to the SMF as defined in FIG. 4.23.9.1-1 step 1.
Secondary RAT usage data is extracted from N2 SM Information within PDU Session To Be Switched received from NG RAN.
The I-SMF also provides the additional parameters supporting indicator for Xn HO, if an indication is received in step 3b 7a. SMF to UPF (PSA): N4 Session Modification Request (DL CN Tunnel Info of the I-UPF).
The SMF provides the DL CN Tunnel Info of the I-UPF to the UPF(PSA).
If old I-UPF controlled by SMF does not exist and if different CN Tunnel Info need to be used by PSA UPF, i.e., the CN Tunnel Info at the PSA for N3 and N9 are different, the CN Tunnel Info at the PSA for N9 needs to be allocated. The CN Tunnel Info is provided from UPF to SMF in the response.

7b. UPF (PSA) to SMF: N4 Session Modification Response.
The PDU Session Anchor responds with the N4 Session Modification Response message after requested PDU Sessions are switched. At this point, PDU Session Anchor starts sending downlink packets to the Target NG-RAN via I-UPF.
PDU Session Anchor sends one or more "end marker" packets for each N3/N9 tunnel on the old path immediately after switching the path, the source NG-RAN shall forward the "end marker" packets to the target NG-RAN.

8. In order to assist the reordering function in the Target NG-RAN, the PDU Session Anchor sends one or more "end marker" packets for each N3/N9 tunnel on the old path immediately after switching the path, the source NG-RAN shall forward the "end marker" packets to the target NG-RAN.

9. SMF to I-SMF: Nsmf_PDUSession_Create Response (Information for local traffic steering location, CN Tunnel Info at the PSA for N9, QoS parameters for the accepted QoS Flows).
The SMF may updates the QoS parameters (e.g., CN PDB due to I-SMF/I-UPF insertion) directly in the response or using separate procedure as specified in clause 4.3.3 PDU Session Modification based on the indication received in step 6 above.

9a. If the CN Tunnel Info at PSA for N9 is allocated, it is included in the response, and the I-SMF provides the CN Tunnel Info at the PSA for N9 to I-UPF via N4 Session Modification Request.
In the case of I-SMF insertion and the PDU session corresponds to a LADN, the SMF shall release the PDU session after the handover procedure is completed.

10. I-SMF to AMF: Nsmf_PDUSession_CreateSMContext Response (UL CN Tunnel Info of the I-UPF, QoS parameters for the accepted QoS Flows).
The SMF sends an Nsmf_PDUSession_CreateSMContext response to the AMF.

11-13. Steps 11-13 are same as steps 7-9 defined in clause 4.9.1.2.2 with the following addition:
If a Source I-UPF controlled by SMF was serving the PDU Session, the SMF initiates Source I-UPF Release procedure by sending an N4 Session Release Request toward the Source I-UPF.

4.23.11.3 Xn Based Handover with Re-Allocation of Intermediate SMF

This procedure is used to hand over a UE from a Source NG-RAN to a Target NG-RAN using Xn interface (in this case the AMF is unchanged) and the AMF decides that the intermediate SMF (I-SMF) is to be changed. This procedure is used for non-roaming or local breakout roaming scenario. In the case of home routed roaming scenario, this procedure is also used except the I-SMF is replaced by V-SMF.

Figure 20:
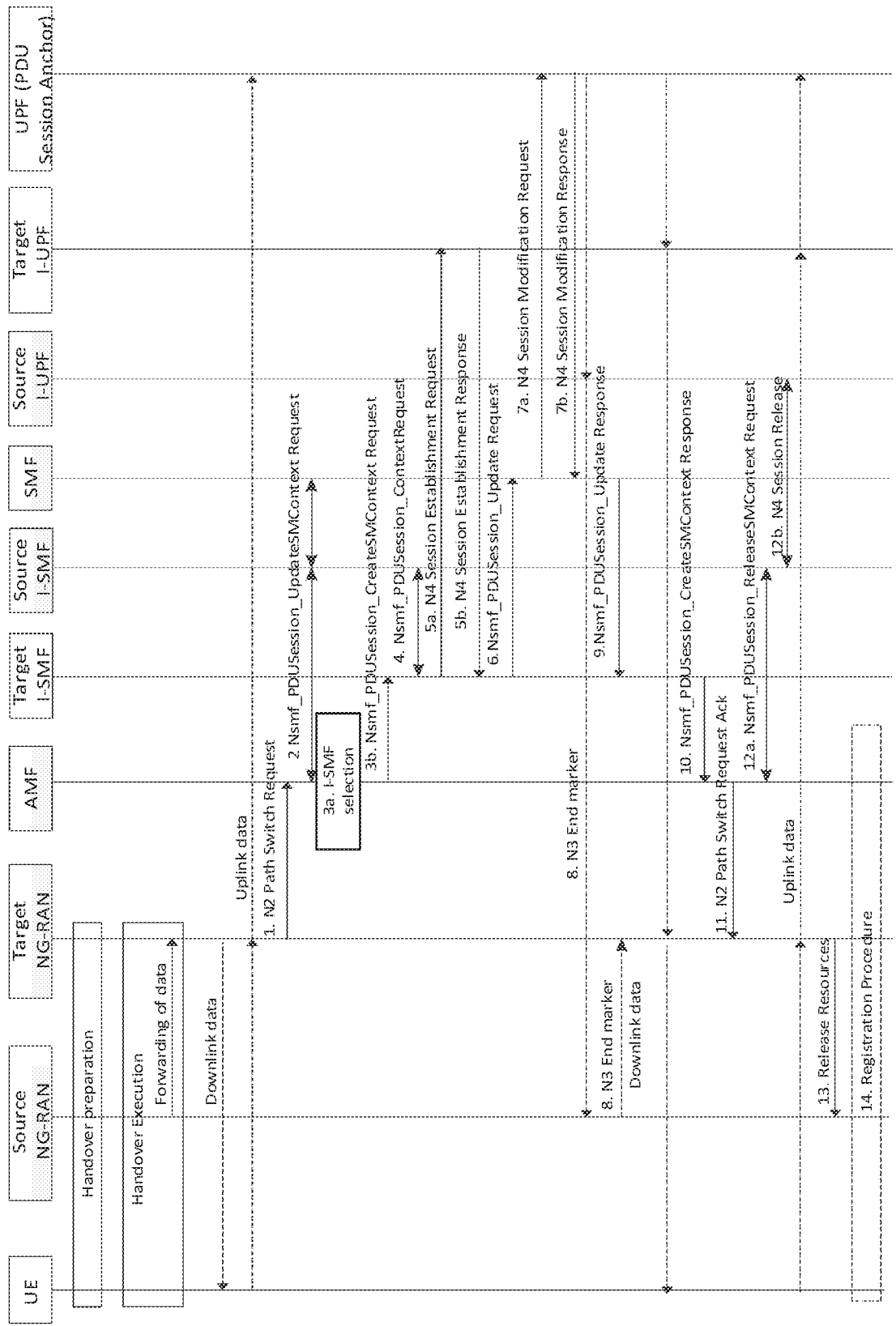
FIG. 20 is a signal diagram illustrating Xn based inter NG-RAN handover with intermediate I-SMF re-allocation.

The call flow is shown in FIG. 20.

1-3. Steps 1-3 are same as steps 1-3 described in clause 4.23.11.2 except that in step 2 the AMF sends Nsmf_PDUSession_UpdateSMContext Request to source I-SMF and then the source I-SMF sends the Nsmf_PDUSession_Update Request to SMF.

4. The target I-SMF sends Nsmf_PDUSession_Context Request to Source I-SMF to retrieve 5G SM Context.

5a-11. Steps 5a-11 are same as steps 5a-11 described in clause 4.23.11.2 with the following difference:
In step 6, the target I-SMF invokes Nsmf_PDUSession_Update Request (Secondary RAT usage data, UE Location Information, UE presence in LADN service area, DL CN Tunnel Info of the I-UPF, DNAI list supported by target I-SMF, additional parameters supporting indicator for Xn HO) toward the SMF;
In step 9, the SMF respond with Nsmf_PDUSession_Update Response. The SMF may provide the DNAI(s) of interest for this PDU Session to I-SMF as described in step 1 of FIG. 4.23.9.1-1. The SMF may updates the QoS parameters (e.g., CN PDB due to I-SMF/I-UPF re-allocation) directly in the response or using separate procedure as specified in clause 4.3.3 PDU Session Modification based on the indication received in step 6 above.
Secondary RAT usage data is extracted from PDU Session To Be Switched with N2 SM Information received from NG RAN.

12a. The AMF sends Nsmf_PDUSession_ReleaseSMContext Request (I-SMF only indication) to source I-SMF. The source I-SMF removes the SM context of this PDU session. An indication is included in this message to avoid invoking resource release in SMF.

12b. The source I-SMF sends N4 Session Release to release the resource in source I-UPF. If the source I-UPF acts as UL CL and is not co-located with local PSA, the source I-SMF also sends N4 Session Release to the local PSA to release the resource for the PDU Session.

13-14. Steps 13-14 are same as steps 12-13 described in clause 4.23.11.2.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a RAN node (102) for supporting a QoS update during an HO (e.g., Xn HO in 5G or X2 HO in EPS) procedure is provided. The method includes providing (600) an indication to a CN node to indicate whether the RAN node can support the QoS update during the HO procedure. The method also includes receiving (602) the QoS update during the HO procedure in response to providing the indication that indicates the RAN node can support the QoS update during the HO procedure.

Embodiment 2: the method also includes not receiving (604) the QoS update during the HO procedure in response to providing the indication that indicates the RAN node cannot support the QoS update during the HO procedure.

Embodiment 3: wherein not receiving (604) the QoS update during the HO procedure comprises receiving (604-1) the QoS update during a PDU session.

Embodiment 4: wherein providing (600) the indication to the CN node comprises providing (600-1) the indication in a Path Switch Request message (e.g., in a "support for reception of additional QoS parameters" field).

Embodiment 5: wherein providing (600) the indication to the CN node comprises providing (600-5) the indication in an NG Setup Request message.

Embodiment 6: wherein providing (600) the indication to the CN node comprises providing (600-2) the indication during a NGAP procedure.

Embodiment 7: wherein providing (600) the indication to the CN node comprises providing (600-3) the indication that indicates one or more selected QoS parameters (e.g., CN Packet Delay Budget, PDB, and Traffic Characteristics, TCS) can be updated during the HO procedure.

Embodiment 8: wherein providing (600) the indication to the CN node comprises providing (600-4) the indication that indicates one or more best-possible QoS parameters the RAN node can support, wherein the indication is provided in a Path Switch Request message (e.g., in a "best QoS available" field or a "best RAN PDB" field).

Embodiment 9: A method performed by a CN node (110) for supporting a QoS update during an HO (e.g., Xn HO in 5G or X2 HO in EPS) procedure is provided. The method includes receiving (700) an indication from a RAN node that indicates whether the RAN node can support the QoS update during the HO procedure. The method also includes providing (702) the QoS update based on the indication received from the RAN node.

Embodiment 10: wherein providing (702) the QoS update includes one of: providing (702-1) the QoS update during the HO procedure in response to receiving the indication that indicates the RAN node can support the QoS update during the HO procedure; and not providing (702-2) the QoS update during the HO procedure in response to receiving the indication that indicates the RAN node cannot support the QoS update during the HO procedure.

Embodiment 11: wherein not providing (702-2) the QoS update during the HO procedure comprises providing (702-2a) the QoS update during a PDU session.

Embodiment 12: wherein receiving (700) the indication from the RAN node comprises receiving (700-1) the indication in a Path Switch Request message (e.g., in a "support for reception of additional QoS parameters" field).

Embodiment 13: wherein receiving (700) the indication to the CN node comprises receiving (700-5) the indication in an NG Setup Request message.

Embodiment 14: wherein receiving (700) the indication from the RAN node comprises receiving (700-2) the indication during a NGAP procedure.

Embodiment 15: wherein receiving (700) the indication from the RAN node comprises receiving (700-3) the indication that indicates one or more selected QoS parameters (e.g., CN PDB and TCS) can be updated during the HO procedure.

Embodiment 16: wherein receiving (700) the indication from the RAN node comprises receiving (700-4) the indication that indicates one or more best-possible QoS parameters the RAN node can support, wherein the indication is provided in a Path Switch Request message (e.g., in a "best QoS available" field or a "best RAN PDB" field) and used to determine a User Plane Function, UPF.

Embodiment 17: the method also includes forwarding (704) the indication from an I-SMF/V-SMF to an SMF/H-SMF in the CN node.

Embodiment 18: A RAN node (900) for supporting QoS update during an HO (e.g., Xn HO in 5G or X2 HO in EPS) procedure is provided. The RAN node (900) includes processing circuitry (902) configured to perform any of the steps of any of the embodiments performed by the RAN node. The RAN node also includes power supply circuitry configured to supply power to the wireless device.

Embodiment 19: A CN node (110) for supporting QoS update during an HO (e.g., Xn HO in 5G or X2 HO in EPS) procedure is provided. The CN node includes processing circuitry configured to perform any of the steps of any of the embodiments performed by the CN node. The CN node also includes power supply circuitry configured to supply power to the base station.

Embodiment 20: A communication system including a host computer comprising processing circuitry configured to provide user data and a communication interface configured to forward the user data to a cellular network for transmission to a UE. The cellular network comprises a base station having a radio interface and processing circuitry, the base station's processing circuitry configured to perform any of the steps of any of the embodiments performed by the CN node.

Embodiment 21: the communication system also includes the base station.

Embodiment 22: the communication system also includes the UE, wherein the UE is configured to communicate with the base station.

Embodiment 23: the processing circuitry of the host computer is configured to execute a host application, thereby providing the user data; and the UE comprises processing circuitry configured to execute a client application associated with the host application.

Embodiment 24: A method implemented in a communication system including a host computer, a base station, and a UE is provided. The method includes at the host computer, providing user data. The method also includes at the host computer, initiating a transmission carrying the user data to the UE via a cellular network comprising the base station, wherein the base station performs any of the steps of any of the embodiments performed by the CN node.

Embodiment 25: the method also includes at the base station, transmitting the user data.

Embodiment 26: wherein the user data is provided at the host computer by executing a host application, the method further comprising, at the UE, executing a client application associated with the host application.

Embodiment 27: A UE configured to communicate with a base station, the UE comprising a radio interface and processing circuitry configured to perform the method of the previous 3 embodiments.

Embodiment 28: A communication system including a host computer comprising: processing circuitry configured to provide user data; and a communication interface configured to forward user data to a cellular network for transmission to a UE. The UE comprises a radio interface and processing circuitry, the UE's components configured to perform any of the steps of any of the embodiments performed by the RAN node.

Embodiment 29: the cellular network further includes a base station configured to communicate with the UE.

Embodiment 30: the processing circuitry of the host computer is configured to execute a host application, thereby providing the user data; and the UE's processing circuitry is configured to execute a client application associated with the host application.

Embodiment 31: A method implemented in a communication system including a host computer, a base station, and a UE is provided. The method includes at the host computer, providing user data. The method also includes at the host computer, initiating a transmission carrying the user data to the UE via a cellular network comprising the base station, wherein the UE performs any of the steps of any of the embodiments performed by the RAN node.

Embodiment 32: the method also includes at the UE, receiving the user data from the base station.

Embodiment 33: A communication system including a host computer comprising: communication interface configured to receive user data originating from a transmission from a UE to a base station. The UE comprises a radio interface and processing circuitry, the UE's processing circuitry configured to perform any of the steps of any of the embodiments performed by the RAN node.

Embodiment 34: the communication system also includes the UE.

Embodiment 35: the communication system also includes the base station, wherein the base station comprises a radio interface configured to communicate with the UE and a communication interface configured to forward to the host computer the user data carried by a transmission from the UE to the base station.

Embodiment 36: the processing circuitry of the host computer is configured to execute a host application; and the UE's processing circuitry is configured to execute a client application associated with the host application, thereby providing the user data.

Embodiment 37: the processing circuitry of the host computer is configured to execute a host application, thereby providing request data; and the UE's processing circuitry is configured to execute a client application associated with the host application, thereby providing the user data in response to the request data.

Embodiment 38: A method implemented in a communication system including a host computer, a base station, and a UE is provided. The method includes at the host computer, receiving user data transmitted to the base station from the UE, wherein the UE performs any of the steps of any of the embodiments performed by the RAN node.

Embodiment 39: the method also includes, at the UE, providing the user data to the base station.

Embodiment 40: the method also includes at the UE, executing a client application, thereby providing the user data to be transmitted. The method also includes at the host computer, executing a host application associated with the client application.

Embodiment 41: the method also includes at the UE, executing a client application. The method also includes at the UE, receiving input data to the client application, the input data being provided at the host computer by executing a host application associated with the client application. The user data to be transmitted is provided by the client application in response to the input data.

Embodiment 42: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the embodiments performed by the CN node.

Embodiment 43: the communication system also includes the base station.

Embodiment 44: the communication system also includes the UE, wherein the UE is configured to communicate with the base station.

Embodiment 45: the processing circuitry of the host computer is configured to execute a host application; and the UE is configured to execute a client application associated with the host application, thereby providing the user data to be received by the host computer.

Embodiment 46: A method implemented in a communication system including a host computer, a base station, and a UE is provided. The method includes at the host computer, receiving, from the base station, user data originating from a transmission which the base station has received from the UE, wherein the UE performs any of the steps of any of the embodiments performed by the RAN node.

Embodiment 47: the method also includes at the base station, receiving the user data from the UE.

Embodiment 48: the method also includes at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core 5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HO Handover
HSS Home Subscriber Server
IoT Internet of Things
IP Internet Protocol
I-SMF Intermediate Session Management Function
LTE Long Term Evolution
MME Mobility Management Entity
MTC Machine Type Communication
NEF Network Exposure Function
NF Network Function
NG New Generation
NGAP New Generation Application Protocol
NR New Radio
NRF Network Function Repository Function
NSSF Network Slice Selection Function
OTT Over-the-Top
PC Personal Computer
PCF Policy Control Function
PDB Packet Delay Budget
PDU Protocol Data Unit
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TCS Traffic Characteristics
UDM Unified Data Management
UE User Equipment
UPF User Plane Function
URLLC Ultra Reliable and Low Latency Communication Those skilled in the art will recognize improvements and modifications to the embodiments of the present disclosure. All such improvements and modifications are considered within the scope of the concepts disclosed herein.

The invention claimed is:

1. A method performed by a Radio Access Network, RAN, node for supporting a Quality-of-Service, QoS, update during a Handover, HO, procedure, comprising:
providing a 'support for reception of additional QoS parameters' field in a Path Switch Request message to a Core Network, CN, node, wherein the 'support for reception of additional QoS parameters' field is configured to indicate whether the RAN node can support a QoS update during the HO procedure; and
performing one or more actions related to the HO procedure in accordance with the 'support for reception of additional QoS parameters' field provided to the CN node.

2. The method of claim 1, wherein performing one or more actions related to the HO procedure comprises one of:
receiving the QoS update during the HO procedure in response to the 'support for reception of additional QoS parameters' field indicating that the RAN node can support the QoS update during the HO procedure;
not receiving the QoS update during the HO procedure in response to the 'support for reception of additional QoS parameters' field indicating that the RAN node cannot support the QoS update during the HO procedure; and
receiving the QoS update during a Protocol Data Unit, PDU, session in response to the 'support for reception of additional QoS parameters' field indicating that the RAN node cannot support the QoS update during the HO procedure.

3. A Radio Access Network, RAN, node comprising processing circuitry configured to cause the RAN node to:
provide a 'support for reception of additional QoS parameters' field in a Path Switch Request message to a Core Network, CN, node, wherein the 'support for reception of additional QoS parameters' field is configured to indicate whether the RAN node can support a Quality-of-Service, QoS, update during the HO procedure; and
perform one or more actions related to the HO procedure in accordance with the 'support for reception of additional QoS parameters' field provided to the CN node.

4. The RAN node of claim 3, wherein the one or more actions related to the HO procedure comprises one of:
receiving the QoS update during the HO procedure in response to the 'support for reception of additional QoS parameters' field indicating that the RAN node can support the QoS update during the HO procedure;
not receiving the QoS update during the HO procedure in response to the 'support for reception of additional QoS parameters' field indicating that the RAN node cannot support the QoS update during the HO procedure; and
receiving the QoS update during a Protocol Data Unit, PDU, session in response to the 'support for reception of additional QoS parameters' field indicating that the RAN node cannot support the QoS update during the HO procedure.

5. A method performed by a Core Network, CN, node for supporting a Quality-of-Service, QoS, update during a Handover, HO, procedure, comprising:
receiving a 'support for reception of additional QoS parameters' field in a Path Switch Request message from a Radio Access Network, RAN, node, wherein the 'support for reception of additional QoS parameters' field is configured to indicate whether the RAN node can support a QoS update during the HO procedure; and
performing one or more actions related to the HO procedure in accordance with the 'support for reception of additional QoS parameters' field received from the RAN node.

6. The method of claim 5, wherein performing one or more actions related to the HO procedure comprises one of:
providing a QoS update during the HO procedure in response to the 'support for reception of additional QoS parameters' field indicating that the RAN node can support the QoS update during the HO procedure;
not providing the QoS update during the HO procedure in response to the 'support for reception of additional QoS parameters' field indicating that the RAN node cannot support the QoS update during the HO procedure; and providing the QoS update during a Protocol Data Unit, PDU, session in response to the 'support for reception of additional QoS parameters' field indicating that the RAN node cannot support the QoS update during the HO procedure.

7. The method of claim 5, wherein performing one or more actions related to the HO procedure further comprises one or more of:

forwarding the 'support for reception of additional QoS parameters' field from an Intermediate Session Management Function, I-SMF, associated with the CN node to a Session Management Function, SMF, associated with the CN node; and forwarding the 'support for reception of additional QoS parameters' field from a Visited SMF, V-SMF, associated with the CN node to a Home SMF, H-SMF, associated with the CN node.

8. A Core Network, CN, node comprising processing circuitry configured to cause the CN node to:

receive a 'support for reception of additional QoS parameters' field in a Path Switch Request message from a Radio Access Network, RAN, node, wherein the 'support for reception of additional QoS parameters' field is configured to indicate whether the RAN node can support a Quality-of-Service, QoS, update during the HO procedure; and perform one or more actions related to the HO procedure in accordance with the 'support for reception of additional QoS parameters' field received from the RAN node.

9. The CN node of claim 8, wherein the one or more actions related to the HO procedure comprise one of:

providing a QoS update during the HO procedure in response to the 'support for reception of additional QoS parameters' field indicating that the RAN node can support the QoS update during the HO procedure;

not providing the QoS update during the HO procedure in response to the 'support for reception of additional QoS parameters' field indicating that the RAN node cannot support the QoS update during the HO procedure; and providing the QoS update during a Protocol Data Unit, PDU, session in response to the 'support for reception of additional QoS parameters' field indicating that the RAN node cannot support the QoS update during the HO procedure.

* * * * *